United States Patent
Li

(10) Patent No.: US 12,229,025 B2
(45) Date of Patent: Feb. 18, 2025

(54) DATA STORAGE METHOD AND DEVICE

(71) Applicant: Shenzhen Yinwang Intelligent Technologies Co., Ltd., Shenzhen (CN)

(72) Inventor: Xiaojie Li, Shanghai (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/190,323

(22) Filed: Mar. 27, 2023

(65) Prior Publication Data

US 2023/0229571 A1    Jul. 20, 2023

Related U.S. Application Data

(63) Continuation of application No. PCT/CN2020/118086, filed on Sep. 27, 2020.

(51) Int. Cl.
  *G06F 11/00*  (2006.01)
  *G06F 11/07*  (2006.01)
  *G06F 11/16*  (2006.01)

(52) U.S. Cl.
  CPC ...... *G06F 11/1658* (2013.01); *G06F 11/0772* (2013.01)

(58) Field of Classification Search
  CPC ............ G06F 11/1658; G06F 11/0772; G06F 11/0727; G06F 11/1084; G06F 11/1612; G06F 11/1662; G06F 11/1666
  See application file for complete search history.

(56) References Cited

U.S. PATENT DOCUMENTS 7,613,947 B1 * 11/2009 Coatney .............. G06F 11/2033
                                                    714/6.1
2007/0239790 A1 * 10/2007 Cattell ................ G06F 11/1666
(Continued)

FOREIGN PATENT DOCUMENTS

CN          1462116 A      12/2003
CN        102855163 A       1/2013
(Continued)

OTHER PUBLICATIONS

"MySQL-Semisynchronous Replication", MySQL 8 .0 Reference Manual, Sep. 18, 2020, XP093075539, 4 pages.
(Continued)

*Primary Examiner* — Joseph D Manoskey
(74) *Attorney, Agent, or Firm* — Conley Rose, P.C.

(57) ABSTRACT

A data storage method includes deploying a data storage service system including two nodes on a wheeled mobile device, where the wheeled mobile device is an intelligent vehicle, an autonomous vehicle, or a connected vehicle; running a first process on a first node; running a second process on a second node, where the first node is a primary node and the second node is a secondary node; invoking, by the first node, a first database engine using the first process to write data to a first storage module on the first node when the first node receives a data write request; and enabling by the first node, in a blocking mode, the second node to invoke a second database engine using the second process to perform a same data write operation on a second storage module on the second node.

20 Claims, 8 Drawing Sheets

(56) References Cited

U.S. PATENT DOCUMENTS

| | | | | |
|---|---|---|---|---|
| 2015/0363124 A1* | 12/2015 | Rath | ............ | G06F 11/1425 |
| | | | | 709/219 |
| 2018/0285201 A1* | 10/2018 | Bangalore | ......... | G06F 11/2097 |
| 2020/0278984 A1* | 9/2020 | Kaushik | ............ | G06F 11/2076 |
| 2020/0334125 A1* | 10/2020 | Degaonkar | ....... | G06F 11/3006 |

FOREIGN PATENT DOCUMENTS

| | | |
|---|---|---|
| CN | 103995759 B | 4/2015 |
| CN | 102945195 B | 11/2015 |
| CN | 109871298 A | 6/2019 |
| CN | 110502460 A | 11/2019 |

OTHER PUBLICATIONS

"Replication (computing)", Wikipedia, Sep. 2, 2020, XP093075423, 6 pages.

\* cited by examiner

DATA STORAGE METHOD AND DEVICE

CROSS-REFERENCE TO RELATED APPLICATIONS

This application is a continuation application of International Patent Application No. PCT/CN2020/118086, filed on Sep. 27, 2020, the disclosure of which is hereby incorporated by reference in its entirety.

TECHNICAL FIELD

This application relates to the field of data storage technologies, and in particular, to a data storage method and a device.

BACKGROUND

With evolution of vehicle intelligence, more data is generated and used, especially in the field of intelligent driving. Because data such as running status data, perception data, intermediate calculation results, and service-oriented architecture (SOA) information of a vehicle needs to be frequently read, high requirements are imposed on real-time data reading, data storage reliability, data availability, and the like. Against this background, requirements on a data processing capability, the data storage reliability, and the like constantly increase, resulting in more diversified data storage requirements.

In the conventional technology, a distributed cluster deployment manner is usually used to improve data storage reliability. A clustered data storage service system is constructed by using a lightweight database engine in combination with a distributed consistency algorithm. There are two deployment manners of the data storage service system. (1) As shown in FIG. 1, an example of deploying three node devices (which may also be referred to as nodes) is used for illustration. Data read/write requests of applications (APP) serving as clients are centrally processed by a process S2 running on a primary node (leader). Then, the process S2 synchronizes data in storage modules on the nodes by sending a synchronization (SYNC) command request to processes (for example, a process S1 and a process S3) of other nodes in the cluster (where the synchronization is implemented by a database engine on the node, and the database engine may also be referred to as an engine). (2) As shown in FIG. 2, still an example of deploying three nodes is used for illustration. Each APP serving as a client accesses a nearest node. If a node has updated data, a process running on the node sends a SYNC command request to a process running on another node, to implement data synchronization in storage modules on the nodes.

The foregoing deployment manners both depend on the distributed consistency algorithm (for example, a paxos algorithm and an evolution algorithm thereof, or a raft algorithm). These algorithms have a key constraint. For all election procedures (for example, a leader election procedure), data write operations, or the like, a consensus is reached only when more than half of processes on all nodes in the cluster agree. Due to the mandatory requirement that a consensus is reached only when more than half of processes agree, three or more odd-numbered nodes are usually deployed. However, in the automotive field, costs of vehicle components are strictly controlled, and a data reliability requirement is high. In the foregoing manner of deploying three nodes, many redundant data backups and high resource consumption result in high hardware costs. Therefore, this manner cannot meet requirements such as high data reliability and low costs at the same time. In particular, many mid-end and low-end vehicle models cannot afford an increase of these hardware costs.

SUMMARY

Embodiments of this application provide a data storage method and a device. On a premise that two node devices are deployed on a wheeled mobile device (for example, an autonomous vehicle), the method may be used to implement real-time data backup by using a strong-consistency data synchronization procedure (for example, data in a first node device and a second node device in a system is the same at any moment), thereby ensuring data reliability. In addition, compared with a manner in which at least three node devices are deployed in the conventional technology, a manner in which two node devices are deployed in this application reduces hardware costs of the wheeled mobile device. In other words, high-reliability data storage is implemented in a hardware architecture of a low-cost wheeled mobile device.

Based on this, the embodiments of this application provide the following technical solutions. In the following implementations of this application, the first node device is also referred to as a first node, and the second node device is also referred to as a second node.

According to a first aspect, an embodiment of this application first provides a data storage method. The method includes a first node, serving as a primary node, receives, by using a first process running on the first node, a first request sent by a first APP. The first APP may be an APP corresponding to the first process. The first process is a process related to data storage processing. The first APP is configured to obtain perception information of an ambient environment of a wheeled mobile device (for example, may obtain the perception information through a camera, a radar, or another sensor deployed on the wheeled mobile device) and generate a data operation instruction (namely, a first request) based on the perception information. The first request is sent by the first APP to the first process running on the first node corresponding to the first APP. In this embodiment of this application, the first request is used to indicate to write target data (which may be referred to as first data) to a storage module (for example, a hard disk or a memory). The first node obtains the first request sent by the first APP. In response to the first request, the first node may write the first data to a first storage module on the first node based on a first database engine on the first process. It should be noted herein that the first request is used to indicate to write the first data to a storage module, but the storage module to which the first data is written is not limited. For example, if the first node invokes the first database engine by using the first process, the first data is written to the first storage module on the first node based on the first request. For another example, if a second node invokes a second database engine by using a second process, the first data is written to a second storage module on the second node based on the first request. The first node sends the first request to the second node by using the first process only when the operation of writing the first data to the first storage module is completed, and a purpose of sending the first request to the second node is to enable the second node to further write the first data to the second storage module on the second node based on the first request. After receiving the first request sent by the first node by using the first process, the second node writes the first data to the second storage module on the second node by invoking the second database engine on the second process (running on the second node). In this way, updated data in the second storage module on the second node can be completely consistent with updated data in the first storage module. Similar to the first process, the second process is also a process related to data storage processing. When the operation of writing the first data to the second storage module on the second node by invoking the second database engine on the second process is completed, the second node sends a first response message to the first node by using the second process. The first response message is used to indicate that the operation of writing the first data to the second storage module is completed. When the first node receives, within preset duration by using the first process, the first response message sent by the second node by using the second process, the first node may determine that the second node also completes a write operation on the first data, and the first node sends a second response message to the first application by using the first process. The second response message is used to indicate that both the operation of writing the first data to the first storage module and the operation of writing the first data to the second storage module are completed. In some implementations, the method may be applied to a wheeled mobile device, and the wheeled mobile device may include the first node and the second node.

In the foregoing implementations of this application, on a premise that only two nodes are deployed on the wheeled mobile device (for example, an autonomous vehicle, an intelligent vehicle, or a connected vehicle), when both the APP sending the first request to the first node (serving as the primary node) and the first process on the first node run on a same operating system (OS), real-time data backup is implemented by using the foregoing strong-consistency data synchronization procedure (for example, data in a first node device and a second node device in a system is the same at any moment), thereby ensuring data reliability. In addition, compared with a manner in which at least three node devices are deployed in the conventional technology, a manner in which two node devices are deployed in this application reduces hardware costs of the wheeled mobile device. In other words, high-reliability data storage is implemented in a hardware architecture of a low-cost wheeled mobile device.

In a possible design of the first aspect, if the first node is faulty, the second node immediately replaces the first node to continue to provide a service, and caches data. The cached data is data updated in the second storage module after the second node replaces the first node as the primary node. In addition, after the first node recovers to normal use, the cached data is sent to the first node by using the second process, so that the first node updates the cached data to the first storage module of the first node by invoking the first database engine, to implement data synchronization between the two nodes.

In the foregoing implementation of this application, if the first node is faulty (where the first node serves as the primary node and the second node serves as a secondary node), the second node immediately becomes the primary node and replaces the first node to perform the service, to ensure availability of a data storage service system and avoid data loss.

In a possible design of the first aspect, the second node may replace the first node in the following several replacement manners to continue to provide the following services. Service a. The second node replaces the first node to provide the service until the first node recovers to normal use. In other words, the second node does not replace the first node after the first node recovers to normal use, and the second node still works as the secondary node. Generally, in this case, the first node has a high configuration, and the second node has a low configuration. In an example, hardware configurations of the first node and the second node are different, and a primary database engine runs on the high-configuration first node. When the high-configuration first node is faulty, the low-configuration second node may replace the first node to provide the service in a short period of time. After the first node recovers to normal use, the first node continues to provide the service as the primary node. This manner of setting the nodes with high and low configurations is also for cost reduction. Service b. The second node always replaces the first node to provide the service. In an example, after the second node replaces the first node to provide the service as the primary node, the second node always serves as the primary node to provide the service regardless of whether the first node recovers to normal use subsequently. If the first node recovers to normal use later, the first node always serves as the secondary node. Generally, this always-replace manner is used when hardware configurations of the first node and the second node are not different.

In the foregoing implementation of this application, two manners in which the second node replaces the first node to provide the service when the first node is faulty are described, and the manners are flexible and optional.

In a possible design of the first aspect, determining that the first node is faulty may include the following several manners.

a. A heartbeat sent by the first node to the second node is abnormal. For example, it is assumed that a frequency at which the first node sends the heartbeat to the second node is normally once every 300 milliseconds. The first node sends the heartbeat to the second node is to notify the second node that the first node runs normally, but if the second node does not receive, within preset duration (for example, within 1 second), the heartbeat sent by the first node, the second node considers that the first node is faulty. b. The first node actively sends a fault notification message to the second node. For example, when software on the first process running on the first node normally or abnormally exits, the first node actively sends the fault notification message to the second node. For another example, when a third process monitoring the first process on the first node detects that the first process is abnormal, the first node also actively sends the fault notification message to the second node. For another example, if communication of the first node is abnormal, the first node also actively sends the fault notification message to the second node. No specific example is given for description herein.

In the foregoing implementation of this application, the foregoing two fault perception manners are to enable the second node to quickly perceive that a fault occurs on the first node, thereby shortening a fault detection delay. Compared with the first fault perception manner, the second fault perception manner can enable the second node to more quickly perceive that a fault occurs on the first node. Before determining that the first node is faulty, the second node does not need to wait for the preset duration without receiving the heartbeat from the first node, so as to further shorten the fault detection delay.

In a possible design of the first aspect, if the second node is faulty, the first node may set a state of the second node to an abnormal state, and the first node continues to provide the service as the primary node, and caches data (namely, second data). The cached data is data obtained after the first node writes the first data to the first storage module by using the first process. In addition, after the second node recovers to normal use, the cached data is sent to the second node by using the first process, so that the second node updates the cached data to the second storage module of the second node by invoking the second database engine, to implement data synchronization between the two nodes.

As described in the foregoing implementation of this application, if the second node is faulty, the first node continues to provide the service as the primary node, and after the second node recovers to normal use, the cached second data is sent to the second node by using the first process, so that the second node updates the cached second data to the second storage module of the second node by invoking the second database engine, to implement data synchronization between the two nodes. This is implementable.

In a possible design of the first aspect, determining that the second node is faulty may also include the following several manners. Manner a. A heartbeat sent by the second node to the first node is abnormal. For example, it is assumed that a frequency at which the second node sends the heartbeat to the first node is normally once every 300 milliseconds. The second node sends the heartbeat to the first node is also to notify the first node that the second node runs normally, but if the first node does not receive, within preset duration (for example, within 1 second), the heartbeat sent by the second node, the first node considers that the second node is faulty. Manner b. The second node actively sends a fault notification message to the first node. For example, when software on the second process running on the second node normally or abnormally exits, the second node actively sends the fault notification message to the first node. For another example, when a fourth process monitoring the second process on the second node detects that the second process is abnormal, the second node also actively sends the fault notification message to the first node. For another example, if communication of the second node is abnormal, the second node also actively sends the fault notification message to the first node. No specific example is given for description herein.

In the foregoing implementation of this application, the foregoing two fault perception manners are to enable the first node to quickly perceive that a fault occurs on the second node, thereby shortening a fault detection delay. Compared with the first fault perception manner, the second fault perception manner can enable the first node to more quickly perceive that a fault occurs on the second node. Before determining that the second node is faulty, the first node does not need to wait for the preset duration without receiving the heartbeat from the second node, so as to further shorten the fault detection delay.

In a possible design of the first aspect, in a possible design, the first storage module includes a first in-memory database, and/or the second storage module includes a second in-memory database.

As described in the foregoing implementation of this application, the first storage module and the second storage module may be in-memory databases. Compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

In a possible design of the first aspect, after the operation of writing the first data to the first storage module on the first node by invoking the first database engine by using the first process is completed, the first node may further record (for example, update) a current data version number by using the first process. The current data version number may be referred to as a first data version number, and is used to indicate an updated data version (which may be referred to as a first data version) of data in the first storage module. The updated data version is a data version obtained when the operation of writing the first data to the first storage module is completed. For example, it is assumed that a data version number before a current data write operation is P. In this case, after the current write operation is performed on the first data, data currently in the first storage module is of the latest version, and a data version number may be recorded as P+1.

In the foregoing implementation of this application, after the write operation is performed on the first data by using the first process, a current updated data version number further needs to be recorded. In this way, it is convenient to find which version of data is updated each time, which data is updated, or the like.

In a possible design of the first aspect, after the operation of writing the first data to the second storage module on the second node by invoking the second database engine by using the second process is completed, the second node may further record (for example, update) a current data version number by using the second process. The current data version number may be referred to as a second data version number, and is used to indicate an updated data version (which may be referred to as a second data version) of data in the second storage module. The updated data version is a data version obtained when the operation of writing the first data to the second storage module is completed. For example, it is assumed that a data version number before a current data write operation is Q. In this case, after the current write operation is performed on the first data, data currently in the second storage module is of the latest version, and a data version number may be recorded as Q+1. In this way, it is convenient to find which version of data is updated each time, which data is updated, or the like. It should be noted herein that each time the node performs a write operation on the data, the first storage module on the first node and the second storage module on the second node are updated synchronously. Therefore, values of P and Q are substantially the same.

In the foregoing implementation of this application, after the write operation is performed on the first data by using the second process, a current updated data version number also needs to be recorded. In this way, it is convenient to find which version of data is updated each time, which data is updated, or the like.

In a possible design, the wheeled mobile device may be an autonomous vehicle, and the autonomous vehicle may be a car, a truck, a motorcycle, a bus, a boat, an airplane, a helicopter, a lawn mower, a recreational vehicle, a playground vehicle, a construction device, a tram, a golf cart, a train, a cart, or the like. This is not limited in this embodiment of this application.

As described in the foregoing implementation of this application, the wheeled mobile device may be an autonomous vehicle. This is implementable.

A second aspect of the embodiments of this application further provides a data storage method, applied to a wheeled mobile device. The wheeled mobile device includes a first node and a second node. The method includes a second node, serving as a secondary node, receives, by using a second process running on the second node, a second request sent by a second APP corresponding to the second process. The second process is a process related to data storage processing. The second APP is configured to obtain perception information of an ambient environment of the wheeled mobile device (for example, may obtain the perception information through a camera, a radar, or another sensor deployed on the wheeled mobile device) and generate a data operation instruction (namely, a second request) based on the perception information. The second request is sent by the second APP to the second process running on the second node corresponding to the second APP. In this embodiment of this application, the second request is used to indicate to write target data (which may be referred to as third data) to a storage module (for example, a hard disk or a memory). In this embodiment of this application, the second node is used as the secondary node. Therefore, after receiving the second request sent by the corresponding second APP, the second node needs to forward the second request to the first node serving as a primary node for processing. In an example, the first node receives, by using a first process running on the first node, the second request forwarded by the second process running on the second node. The first node obtains the second request sent by the second APP, and may invoke, based on the second request by using the first process, a first database engine on the first process to write the third data to a first storage module on the first node. It should be noted herein that the second request is used to indicate to write the third data to a storage module, but the storage module to which the third data is written is not limited. For example, if the first node invokes the first database engine by using the first process, the third data is written to the first storage module on the first node based on the second request. For another example, if the second node invokes a second database engine by using the second process, the third data is written to a second storage module on the second node based on the second request. When the operation of writing the third data to the first storage module is completed, the first node sends a third response message to the second node by using the first process. The third response message is used to indicate the second node to invoke, by using the second process, the second database engine on the second process to write the third data to the second storage module on the second node based on the second request. After receiving the second request sent by the first node by using the first process, the second node performs, by invoking the second database engine on the second process, an operation of writing the third data to the second storage module on the second node. In this way, updated data in the second storage module on the second node can be completely consistent with updated data in the first storage module. Similar to the first process, the second process is also a process related to data storage processing. When the operation of writing the third data to the second storage module on the second node by invoking the second database engine on the second process is completed, the second node sends a fourth response message to the first node by using the second process. The fourth response message is used to indicate that the operation of writing the third data to the second storage module is completed. When the first node receives, within preset duration by using the first process, the fourth response message sent by the second node by using the second process, the first node sends a fifth response message to the second node by using the first process. The fifth response message is used to indicate that both the operation of writing the third data to the first storage module and the operation of writing the third data to the second storage module are completed. The second node receives, by using the second process, the fifth response message sent by the first node by using the first process, and forwards the fifth response message to the second application. In this way, the second application may also perceive that both the first node and the second node complete the write operation on the third data.

In the foregoing implementations of this application, on a premise that only two nodes are deployed on the wheeled mobile device (for example, an autonomous vehicle, an intelligent vehicle, or a connected vehicle), when the APP sending the second request to the second node (serving as the secondary node) and the first process on the first node run on different OSs, real-time data backup is implemented by using the foregoing strong-consistency data synchronization procedure (for example, data in a first node device and a second node device in a system is the same at any moment), thereby ensuring data reliability. In addition, compared with a manner in which at least three nodes are deployed in the conventional technology, a manner in which two nodes are deployed in this application further reduces hardware costs of the wheeled mobile device. In other words, high-reliability data storage is implemented in a hardware architecture of a low-cost wheeled mobile device.

In a possible design of the second aspect, if the first node is faulty, the second node immediately replaces the first node to continue to provide a service, and caches data. The cached data is data updated in the second storage module after the second node replaces the first node as the primary node. In addition, after the first node recovers to normal use, the cached data is sent to the first node by using the second process, so that the first node updates the cached data to the first storage module of the first node by invoking the first database engine, to implement data synchronization between the two nodes.

In the foregoing implementation of this application, if the first node is faulty (where the first node serves as the primary node and the second node serves as the secondary node), the second node immediately becomes the primary node and replaces the first node to perform the service, to ensure availability of a data storage service system and avoid data loss.

In a possible design of the second aspect, the second node may replace the first node in the following several replacement manners to continue to provide the following services. Service a. The second node replaces the first node to provide the service until the first node recovers to normal use. In other words, the second node does not replace the first node after the first node recovers to normal use, and the second node still works as the secondary node. Generally, in this case, the first node has a high configuration, and the second node has a low configuration. In an example, hardware configurations of the first node and the second node are different, and a primary database engine runs on the high-configuration first node. When the high-configuration first node is faulty, the low-configuration second node may replace the first node to provide the service in a short period of time. After the first node recovers to normal use, the first node continues to provide the service as the primary node. This manner of setting the nodes with high and low configurations is also for cost reduction. Service b. The second node always replaces the first node to provide the service. In an example, after the second node replaces the first node to provide the service as the primary node, the second node always serves as the primary node to provide the service regardless of whether the first node recovers to normal use subsequently. If the first node recovers to normal use later, the first node always serves as the secondary node. Generally, this always-replace manner is used when hardware configurations of the first node and the second node are not different.

In the foregoing implementation of this application, two manners in which the second node replaces the first node to provide the service when the first node is faulty are described, and the manners are flexible and optional.

In a possible design of the second aspect, determining that the first node is faulty may include the following several manners.

a. A heartbeat sent by the first node to the second node is abnormal. For example, it is assumed that a frequency at which the first node sends the heartbeat to the second node is normally once every 300 milliseconds. The first node sends the heartbeat to the second node is to notify the second node that the first node runs normally, but if the second node does not receive, within preset duration (for example, within 1 second), the heartbeat sent by the first node, the second node considers that the first node is faulty. b. The first node actively sends a fault notification message to the second node. For example, when software on the first process running on the first node normally or abnormally exits, the first node actively sends the fault notification message to the second node. For another example, when a third process monitoring the first process on the first node detects that the first process is abnormal, the first node also actively sends the fault notification message to the second node. For another example, if communication of the first node is abnormal, the first node also actively sends the fault notification message to the second node. No specific example is given for description herein.

In the foregoing implementation of this application, the foregoing two fault perception manners are to enable the second node to quickly perceive that a fault occurs on the first node, thereby shortening a fault detection delay. Compared with the first fault perception manner, the second fault perception manner can enable the second node to more quickly perceive that a fault occurs on the first node. Before determining that the first node is faulty, the second node does not need to wait for the preset duration without receiving the heartbeat from the first node, so as to further shorten the fault detection delay.

In a possible design of the second aspect, if the second node is faulty, the first node may set a state of the second node to an abnormal state, and the first node continues to provide the service as the primary node, and caches data (namely, second data). The cached data is data obtained after the first node writes the third data to the first storage module by using the first process. In addition, after the second node recovers to normal use, the cached data is sent to the second node by using the first process, so that the second node updates the cached data to the second storage module of the second node by invoking the second database engine, to implement data synchronization between the two nodes.

As described in the foregoing implementation of this application, if the second node is faulty, the first node continues to provide the service as the primary node, and after the second node recovers to normal use, the cached second data is sent to the second node by using the first process, so that the second node updates the cached second data to the second storage module of the second node by invoking the second database engine, to implement data synchronization between the two nodes. This is implementable.

In a possible design of the second aspect, determining that the second node is faulty may also include the following several manners Manner a. A heartbeat sent by the second node to the first node is abnormal. For example, it is assumed that a frequency at which the second node sends the heartbeat to the first node is normally once every 300 milliseconds. The second node sends the heartbeat to the first node is also to notify the first node that the second node runs normally, but if the first node does not receive, within preset duration (for example, within 1 second), the heartbeat sent by the second node, the first node considers that the second node is faulty. Manner b. The second node actively sends a fault notification message to the first node. For example, when software on the second process running on the second node normally or abnormally exits, the second node actively sends the fault notification message to the first node. For another example, when a fourth process monitoring the second process on the second node detects that the second process is abnormal, the second node also actively sends the fault notification message to the first node. For another example, if communication of the second node is abnormal, the second node also actively sends the fault notification message to the first node. No specific example is given for description herein.

In the foregoing implementation of this application, the foregoing two fault perception manners are to enable the first node to quickly perceive that a fault occurs on the second node, thereby shortening a fault detection delay. Compared with the first fault perception manner, the second fault perception manner can enable the first node to more quickly perceive that a fault occurs on the second node. Before determining that the second node is faulty, the first node does not need to wait for the preset duration without receiving the heartbeat from the second node, so as to further shorten the fault detection delay.

In a possible design of the second aspect, in a possible design, the first storage module includes a first in-memory database, and/or the second storage module includes a second in-memory database.

As described in the foregoing implementation of this application, the first storage module and the second storage module may be in-memory databases. Compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

In a possible design of the second aspect, after the operation of writing the third data to the first storage module on the first node by invoking the first database engine by using the first process is completed, the first node may further record (for example, update) a current data version number by using the first process. The current data version number may be referred to as a first data version number, and is used to indicate an updated data version (which may be referred to as a first data version) of data in the first storage module. The updated data version is a data version obtained when the operation of writing the third data to the first storage module is completed. For example, it is assumed that a data version number before a current data write operation is X. In this case, after the current write operation is performed on the third data, data currently in the first storage module is of the latest version, and a data version number may be recorded as X+1.

In the foregoing implementation of this application, after the write operation is performed on the third data is completed by using the first process, a current updated data version number further needs to be recorded. In this way, it is convenient to find which version of data is updated each time, which data is updated, or the like.

In a possible design of the second aspect, after the operation of writing the third data to the second storage module on the second node by invoking the second database engine by using the second process is completed, the second node may further record (for example, update) a current data version number by using the second process. The current data version number may be referred to as a second data version number, and is used to indicate an updated data version (which may be referred to as a second data version) of data in the second storage module. The updated data version is a data version obtained when the operation of writing the third data to the second storage module is completed. For example, it is assumed that a data version number before a current data write operation is Y. In this case, after the current write operation is performed on the third data, data currently in the second storage module is of the latest version, and a data version number may be recorded as Y+1. In this way, it is convenient to find which version of data is updated each time, which data is updated, or the like. It should be noted herein that each time the node performs a write operation on the data, the first storage module on the first node and the second storage module on the second node are updated synchronously. Therefore, values of X and Y are substantially the same.

In the foregoing implementation of this application, after the write operation is performed on the third data by using the second process, a current updated data version number also needs to be recorded. In this way, it is convenient to find which version of data is updated each time, which data is updated, or the like.

In a possible design, the wheeled mobile device may be an autonomous vehicle, and the autonomous vehicle may be a car, a truck, a motorcycle, a bus, a boat, an airplane, a helicopter, a lawn mower, a recreational vehicle, a playground vehicle, a construction device, a tram, a golf cart, a train, a cart, or the like. This is not limited in this embodiment of this application.

As described in the foregoing implementation of this application, the wheeled mobile device may be an autonomous vehicle. This is implementable.

A third aspect of the embodiments of this application provides a data storage service system. The system is deployed on a wheeled mobile device, and the system includes a first node and a second node. The first node and the second node have functions of implementing the method in any one of the first aspect or the possible implementations of the first aspect.

A fourth aspect of the embodiments of this application further provides a data storage service system. The system is deployed on a wheeled mobile device, and the system includes a first node and a second node. The first node and the second node have functions of implementing the method in any one of the second aspect or the possible implementations of the second aspect.

A fifth aspect of the embodiments of this application further provides a node. The node is used in a data storage service system. The system is deployed on a wheeled mobile device, and the system includes a first node and a second node. The node serves as the first node and has a function of implementing as the first node in the method in any one of the first aspect or the possible implementations of the first aspect. The function may be implemented by hardware, or may be implemented by hardware executing corresponding software. The hardware or the software includes one or more modules corresponding to the function.

A sixth aspect of the embodiments of this application further provides a node. The node is used in a data storage service system. The system is deployed on a wheeled mobile device, and the system includes a first node and a second node. The node serves as the first node and has a function of implementing as the first node in the method in any one of the second aspect or the possible implementations of the second aspect. The function may be implemented by hardware, or may be implemented by hardware executing corresponding software. The hardware or the software includes one or more modules corresponding to the function.

A seventh aspect of the embodiments of this application provides a data storage service system. The system is deployed on a wheeled mobile device, and the system includes a first node and a second node. The first node includes a first processor and a first memory, and the first processor is coupled to the first memory. The second node includes a second processor and a second memory, and the second processor is coupled to the second memory. The first memory and the second memory are respectively configured to store a first program and a second program. The first processor is configured to invoke the first program stored in the first memory, to perform the steps performed by the first node in any one of the first aspect or the possible implementations of the first aspect of the embodiments of this application. Alternatively, the first processor is configured to invoke the first program stored in the first memory, to perform the steps performed by the first node in any one of the second aspect or the possible implementations of the second aspect of the embodiments of this application. The second processor is configured to invoke the second program stored in the second memory, to perform the steps performed by the second node in any one of the first aspect or the possible implementations of the first aspect of the embodiments of this application. Alternatively, the second processor is configured to invoke the second program stored in the second memory, to perform the steps performed by the second node in any one of the second aspect or the possible implementations of the second aspect of the embodiments of this application.

An eighth aspect of the embodiments of this application provides a computer-readable storage medium. The computer-readable storage medium stores instructions. When the instructions are run on a computer, the computer is enabled to perform the method in any one of the first aspect or the possible implementations of the first aspect, or the computer is enabled to perform the method in any one of the second aspect or the possible implementations of the second aspect.

A ninth aspect of the embodiments of this application provides a computer program product. When the computer program product runs on a computer, the computer is enabled to perform the method in any one of the first aspect or the possible implementations of the first aspect, or the computer is enabled to perform the method in any one of the second aspect or the possible implementations of the second aspect.

DESCRIPTION OF EMBODIMENTS

Figure 1:
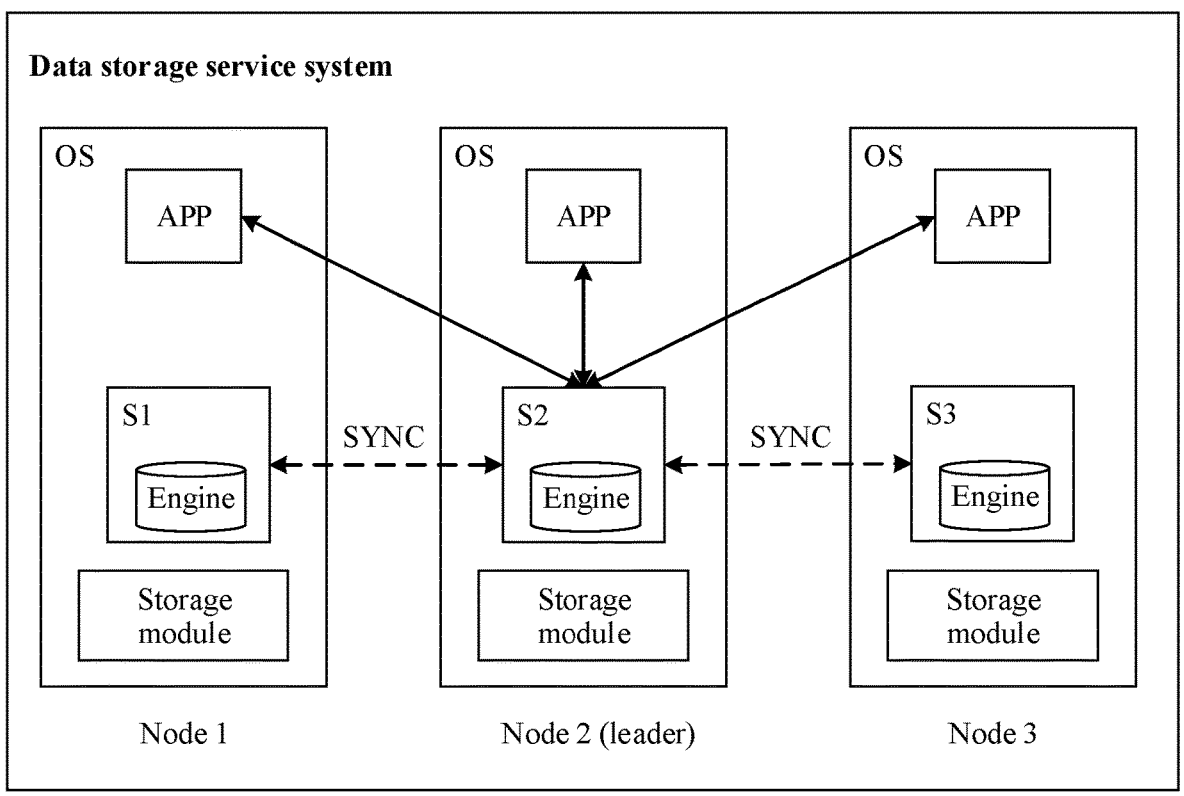
FIG. 1 is a schematic diagram of a deployment manner of a data storage service system according to an embodiment of this application.
Figure 2:
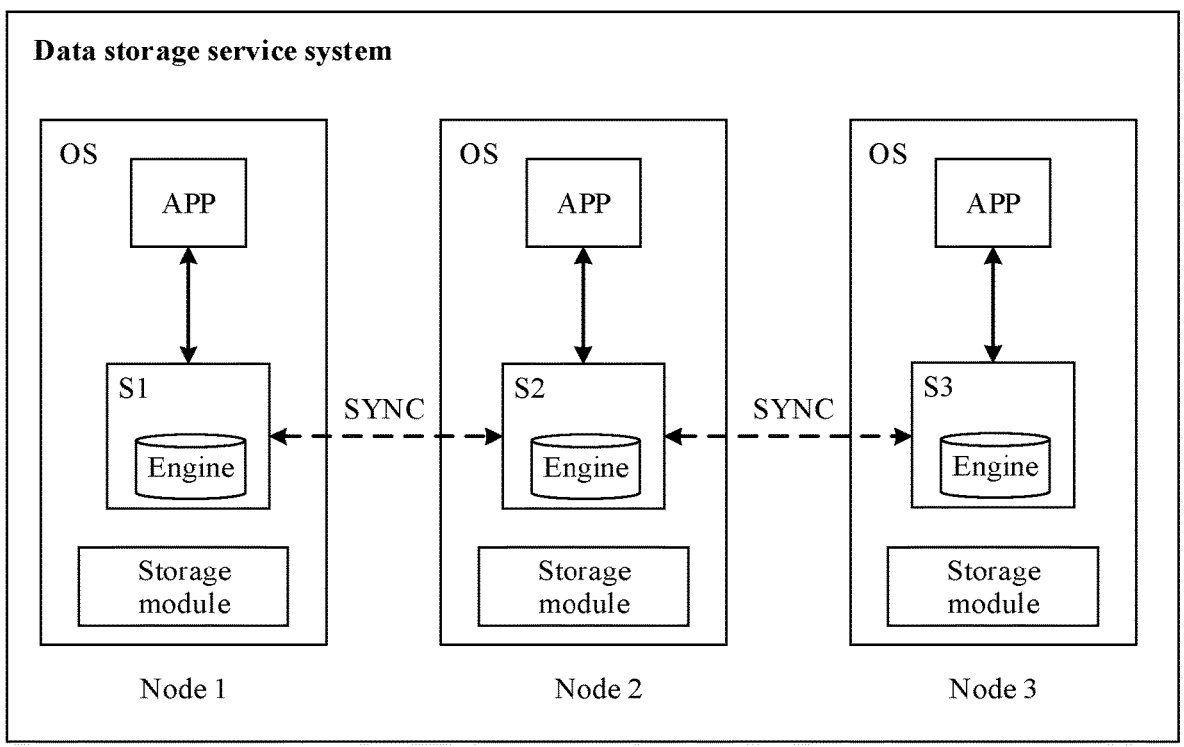
FIG. 2 is another schematic diagram of a deployment manner of a data storage service system according to an embodiment of this application.

The embodiments of this application provide a data storage method and a device. On a premise that two node devices are deployed on a wheeled mobile device (for example, an autonomous vehicle), the method may be used to implement real-time data backup by using a strong-consistency data synchronization procedure (for example, data in a first node device and a second node device in a system is the same at any moment), thereby ensuring data reliability. In addition, compared with a manner in which at least three node devices are deployed in the conventional technology, a manner in which two node devices are deployed in this application reduces hardware costs of the wheeled mobile device. In other words, high-reliability data storage is implemented in a hardware architecture of a low-cost wheeled mobile device.

The embodiments of this application relate to data storage-related knowledge. To better understand the solutions in the embodiments of this application, the following describes related terms and concepts that may be used in the embodiments of this application. It should be understood that explanations of the related concepts may be limited due to specific situations of the embodiments of this application, but it does not mean that this application can only be limited to the specific situations. There may be differences in the specific situations of different embodiments. Details are not limited herein.

(1) Wheeled Mobile Device

The wheeled mobile device is a comprehensive system integrating a plurality of functions such as environment awareness, dynamic decision-making and planning, behavior control and execution, and may also be referred to as a wheeled mobile robot or a wheeled agent. For example, the wheeled mobile device may be a wheeled construction device, an autonomous vehicle, or an advanced driver-assistance vehicle. Any movable device with a wheel is referred to as the wheel mobile device described in this application. For ease of understanding, in the following embodiments of this application, an example in which the wheeled mobile device is an autonomous vehicle is used for description. The autonomous vehicle may be a car, a truck, a motorcycle, a bus, a boat, an airplane, a helicopter, a lawn mower, a recreational vehicle, a playground vehicle, a construction device, a tram, a golf cart, a train, a cart, or the like. This is not particularly limited in this embodiment of this application.

(2) Node

The node may also be referred to as a computer network node or a physical node. In data communication, a physical node may be a data circuit-terminating device, for example, a modem, a hub, a bridge, or a switch, or may be a data terminal device, for example, a digital mobile phone, a printer, or a host (for example, a router, a workstation, or a server). In this embodiment of this application, the node may refer to a physical hardware unit. For example, the node may be a host. The node is also referred to as a node device. In the embodiments of this application, both a first node device and a second node device are referred to as a first node and a second node for short respectively.

(3) Process

The process is a running activity of a program in a computer on a data set, a basic unit for resource allocation and scheduling in a system, and a basis for an OS structure. In an early process-oriented computer architecture, a process is a basic execution entity of a program. In a modern thread-oriented computer architecture, a process is a container for threads. The program is a description of instructions and data and organization forms thereof, and the process is an entity of the program. The process can apply for and own system resources and is an active entity. The process includes not only program code, but also a current activity, and is represented by a value of a program counter and content of a processing register. A concept of the process has two main points. First, the process is an entity. Each process has a separate address space, which generally includes a text region, a data region, and a stack region. The text region stores code executed by a processor. The data region stores variables and dynamically allocated memory used during process execution. The stack region stores instructions and local variables invoked in an activity procedure. Second, the process is a "program in execution". A program is an inanimate entity. Only when the processor gives life to the program (the program is executed by an operating system), can the program become an active entity and be referred to as a process.

(4) Database Engine

The database engine may also be referred to as a data engine. The database engine is a core service used to store, process, and protect data. The database engine may be used to control access permissions and quickly process transactions, so as to meet requirements of most applications that need to handle large amounts of data. The database engine may be used to create a relational database for online transaction processing or online analytical processing data, including creating tables for storing data and database objects (such as indexes, views, and storage procedures) for viewing, managing, and securing the data. In the embodiments of this application, a lightweight database engine runs on each process.

(5) Distributed Consistency Algorithm

Consistency refers to data consistency. In a distributed system, consistency may be understood as data of storage modules on a plurality of nodes being consistent. The distributed consistency algorithm is used to resolve the following two problems. (1) Data cannot be stored only on a single node. Otherwise, data loss may occur due to a failure of the single node; and problem (2) A plurality of nodes need to have the same data to ensure data reliability.

Distributed consistency algorithms can be classified into two types. One is a strong consistency algorithm. In an example, a system ensures that a status of data in each node in a cluster is immediately changed after a change is submitted. Typical algorithms include a paxos algorithm, a raft algorithm, a ZAB algorithm, and the like. The other is a weak consistency algorithm, which may also be referred to as a final consistency algorithm. In an example, a system does not ensure that a status of data in each node in a cluster is immediately changed after a change is submitted, but a final status of data in each node is the same as time elapses. A Gossip protocol is a typical algorithm.

Strong consistency, which may also be referred to as atomic consistency or linear consistency, has two requirements. (1) A latest written version of a piece of data can be read anytime the data is read. (2) An operation sequence of all processes on nodes in the system is the same as that in a global clock. In the embodiments of this application, in short, data in a first node and a second node in the system is the same at any moment.

The following uses the raft algorithm and a deployment manner shown in FIG. 1 as examples to describe how to implement data synchronization on a plurality of nodes in a distributed system (namely, a cluster). It should be noted herein that a corresponding process runs on each node, and all procedures are implemented by the processes running on the respective nodes.

The raft algorithm is a simplification and optimization of the paxos algorithm. The algorithm divides the nodes in the distributed system into a primary node (leader) and a secondary node (which may also be referred to as a follower node (follower)). The primary node is responsible for sending a proposal. The proposal is essentially a request for reading/writing data of the distributed system. The request is generally proposed by a client. The proposal may be represented as [proposal number n, proposal content value]. The secondary node is responsible for voting on the received proposal sent by the primary node. A voting principle is as follows. The node does not agree on a proposal whose proposal number is less than a proposal number of a proposal previously received by the node, but agree on all other proposals. For example, if a secondary node a has voted for a proposal m before, the secondary node a directly votes against a proposal whose number is less than or equal to m. When the primary node is faulty, all secondary nodes automatically become primary node candidates, and contend to become a new primary node.

The following describes basic logic of the raft algorithm. First, a primary node election procedure is disclosed. Each secondary node holds a timer. When the timer expires but there is still no primary node in the cluster, the secondary node declares itself as a primary node candidate and participates in primary node election. At the same time, an election message is sent to other secondary nodes to win votes of the nodes. If the other nodes do not respond to the primary node candidate for a long time, the primary node candidate resends the election message. When the other nodes in the cluster receive the election message, the nodes vote on the primary node candidate. If the primary node candidate is approved by more than half of the nodes, the primary node candidate becomes an $M^{th}$ primary node (where M is the most recent term, provided that an $(M-1)^{th}$ primary node is faulty or loses a primary node qualification). The primary node during the term continuously sends a heartbeat to other nodes (namely, secondary nodes of the $M^{th}$ primary node) to prove that the primary node is alive. After receiving the heartbeat, the other nodes clear timers of the nodes and reply to the heartbeat of the primary node. This mechanism is used to ensure that the other nodes do not participate in primary node election during the term of the primary node. If the primary node is disconnected due to a failure of the primary node, other nodes that do not receive the heartbeat become primary node candidates and enter a next round of primary node election. If two primary node candidates send election messages to other nodes at the same time and obtain a same quantity of votes, the two primary node candidates randomly delay sending the election messages to the other nodes for a period of time. This ensures that no conflict occurs after the selection messages are sent again. Second, a replication procedure of a data status of each node. In the deployment manner shown in FIG. 1, the primary node is responsible for receiving a proposal (namely, a data read/write request) from an application, and proposal content is included in a next heartbeat sent by the primary node. After receiving the heartbeat of the primary node, the secondary node replies to the heartbeat of the primary node if the secondary node agrees on the proposal. After receiving replies of more than half of the secondary nodes, the primary node confirms that the proposal is passed, writes the proposal to a storage space of the primary node, and replies to the application. At the same time, the primary node notifies the secondary nodes to confirm the proposal and write the proposal to respective storage spaces of the secondary nodes. Finally, all the nodes in the distributed system have the same data.

The foregoing merely uses the raft algorithm as an example to illustrate basic logic of the distributed consistency algorithm. Logic of other algorithms is similar. In an example, agreement of more than half of the nodes is required to implement data synchronization between all the nodes in the distributed system. In other words, at least three nodes need to be deployed in each distributed system (where the more-than-half-agreed principle requires odd-numbered nodes).

The following describes the embodiments of this application with reference to the accompanying drawings. A person of ordinary skill in the art may learn that the technical solutions provided in the embodiments of this application are also applicable to a similar technical problem as a technology evolves and a new scenario emerges.

Figure 3:
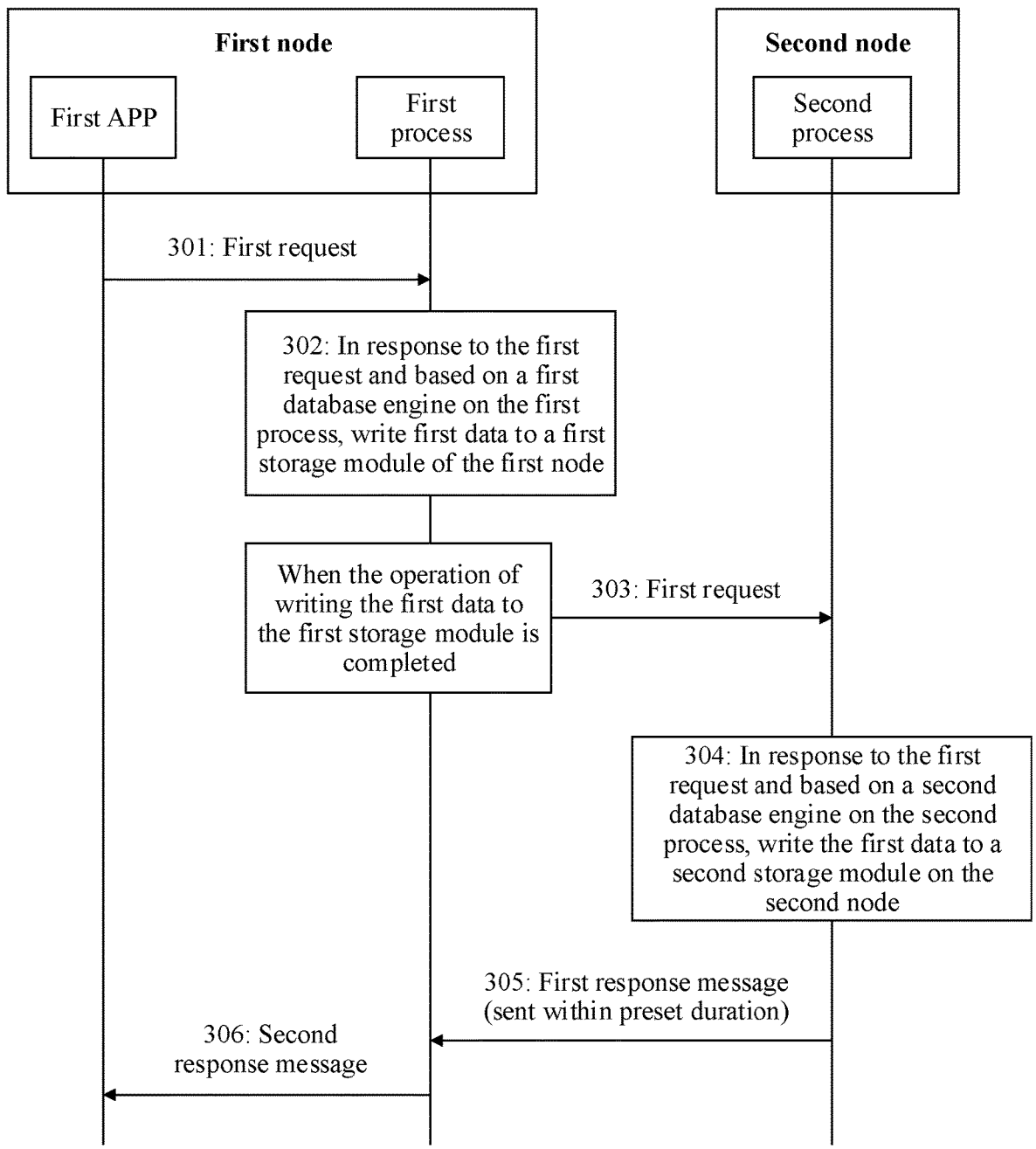
FIG. 3 is a schematic flowchart of a data storage method according to an embodiment of this application.

An embodiment of this application provides a data storage method, and the method may be applied to a wheeled mobile device (for example, an autonomous vehicle, an intelligent vehicle, or a connected vehicle). The wheeled mobile device includes two nodes, such as, a first node and a second node. In this embodiment of this application, a first APP and a first process running on a same OS generally means that the first APP and the first process run on a same node (namely, the first node). The first node serves as a primary node, and the second node serves as a secondary node. For details, refer to FIG. 3. FIG. 3 is a schematic flowchart of the data storage method according to an embodiment of this application. The method may include the following steps.

301: The first node receives, by using the first process running on the first node, a first request sent by the first APP.

First, serving as the primary node, the first node receives, by using the first process running on the first node, the first request sent by the first APP. The first process is a process related to data storage processing. The first APP is configured to obtain perception information of an ambient environment of the wheeled mobile device (for example, may obtain the perception information through a camera, a radar, or another sensor deployed on the wheeled mobile device) and generate a data operation instruction (namely, a first request) based on the perception information. The first request is sent by the first APP to the first process running on the first node corresponding to the first APP. In this embodiment of this application, the first request is used to indicate to write target data (which may be referred to as first data) to a storage module (for example, a hard disk or a memory).

It should be noted that an operation performed on data generally includes two manners such as data reading and data writing. The data reading refers to reading (that is, "querying") data in the storage module, and all APPs read the data in the storage module through the primary node. The data reading does not change the data in the storage module. Therefore, the solution in this embodiment of this application does not involve a read operation on the data. The data writing refers to an adding operation, a deleting operation, a modifying operation (that is, "adding", "deleting", "modifying"), or the like performed on the data in the storage module. An APP running on each node may require to perform the adding operation, the deleting operation, the modifying operation, or the like on the data in the storage module. These operations cause changes in the data in the storage module. Therefore, in the solution of this embodiment of this application, the data operation instruction of the APP includes only performing a write operation on the data in the storage module, for example, the first request is used to indicate to write the first data to the storage module. If the data writing is to "add" data, the first data is data that needs to be added to the storage module, and the first data is included in the first request and sent by the first APP to the first node. If the data writing is to "delete" data, the first data is corresponding to-be-deleted data in the storage module, and related identification information used to indicate the first data is included in the first request and sent by the first APP to the first node. If the data writing is to "modify" data, the first data is corresponding to-be-modified data in the storage module, and modification information and related identification information corresponding to the first data are also included in the first request and sent by the first APP to the first node.

It should be further noted that, in some implementations of this application, the first APP corresponds to the first process. In an example, the first APP corresponding to the first process generally means that the first process and the first APP run on the same OS, or both the first process and the first APP run on the first node. This is not limited herein.

It should be further noted that, in some implementations of this application, the first process is a process related to data storage processing. Another process may also run on the first node at the same time, and different processes process different objects. Generally, only one process related to data storage processing runs on a node.

302: In response to the first request and based on a first database engine on the first process, the first node writes the first data to a first storage module on the first node by using the first process.

The first node obtains the first request sent by the first APP, and may invoke, based on the first request by using the first process, the first database engine on the first process to write the first data to the first storage module on the first node.

It should be noted herein that the first request is used to indicate to write the first data to a storage module, but the storage module to which the first data is written is not limited. For example, if the first node invokes the first database engine by using the first process, the first data is written to the first storage module on the first node based on the first request. For another example, if the second node invokes a second database engine by using a second process, the first data is written to a second storage module on the second node based on the first request.

It should be noted that, in some implementations of this application, after the operation of writing the first data to the first storage module on the first node by invoking the first database engine by using the first process is completed, the first node may further record (for example, update) a current data version number by using the first process. The current data version number may be referred to as a first data version number, and is used to indicate an updated data version (which may be referred to as a first data version) of data in the first storage module. The updated data version is a data version obtained when the operation of writing the first data to the first storage module is completed. For example, it is assumed that a data version number before a current data write operation is P. In this case, after the current write operation is performed on the first data, data currently in the first storage module is of the latest version, and a data version number may be recorded as P+1. In this way, it is convenient to find which version of data is updated each time, which data is updated, or the like.

303: When the operation of writing the first data to the first storage module is completed, the first node sends the first request to the second node by using the first process.

The first node sends the first request to the second node by using the first process only when the operation of writing the first data to the first storage module is completed, and a purpose of sending the first request to the second node is to enable the second node to further write the first data to the second storage module on the second node based on the second request.

304: In response to the received first request, the second node writes the first data to the second storage module on the second node by using the second process based on the second database engine on the second process.

After receiving the first request sent by the first node by using the first process, the second node writes the first data to the second storage module on the second node by invoking the second database engine on the second process (running on the second node). In this way, updated data in the second storage module on the second node can be completely consistent with updated data in the first storage module. Similar to the first process, the second process is also a process related to data storage processing.

It should be noted that, in some implementations of this application, similar to the first node, after the operation of writing the first data to the second storage module on the second node by invoking the second database engine by using the second process is completed, the second node may further record (for example, update) a current data version number by using the second process. The current data version number may be referred to as a second data version number, and is used to indicate an updated data version (which may be referred to as a second data version) of data in the second storage module. The updated data version is a data version obtained when the operation of writing the first data to the second storage module is completed. For example, it is assumed that a data version number before a current data write operation is Q. In this case, after the current write operation is performed on the first data, data currently in the second storage module is of the latest version, and a data version number may be recorded as Q+1. In this way, it is convenient to find which version of data is updated each time, which data is updated, or the like. It should be noted herein that each time the node performs a write operation on the data, the first storage module on the first node and the second storage module on the second node are updated synchronously. Therefore, values of P and Q are substantially the same.

305: The first node receives, within preset duration by using the first process, a first response message sent by the second node by using the second process.

When the operation of writing the first data to the second storage module on the second node by invoking the second database engine on the second process is completed, the second node sends the first response message to the first node by using the second process. The first response message is used to indicate that the operation of writing the first data to the second storage module is completed.

306: The first node sends a second response message to the first application by using the first process.

When the first node receives, within the preset duration by using the first process, the first response message sent by the second node by using the second process, the first node may determine that the second node also completes a write operation on the first data, and the first node sends the second response message to the first application by using the first process. The second response message is used to indicate that both the operation of writing the first data to the first storage module and the operation of writing the first data to the second storage module are completed.

It should be noted that, in some implementations of this application, the first storage module and the second storage module each may be a hard disk or an in-memory database. This is not limited herein. In this embodiment of this application, both the first storage module and the second storage module may be in-memory databases. For example, the first storage module is a first in-memory database, and the second storage module is a second in-memory database. This is because, compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

In the foregoing implementations of this application, on a premise that only two nodes are deployed on the wheeled mobile device (for example, an autonomous vehicle, an intelligent vehicle, or a connected vehicle), when both the APP sending the first request to the first node (serving as the primary node) and the first process on the first node run on the same OS, real-time data backup is implemented by using the foregoing strong-consistency data synchronization procedure (for example, data in a first node device and a second node device in a system is the same at any moment), thereby ensuring data reliability. In addition, compared with a manner in which at least three nodes are deployed in the conventional technology, a manner in which two nodes are deployed in this application reduces hardware costs of the wheeled mobile device. In other words, high-reliability data storage is implemented in a hardware architecture of a low-cost wheeled mobile device.

Figure 4:
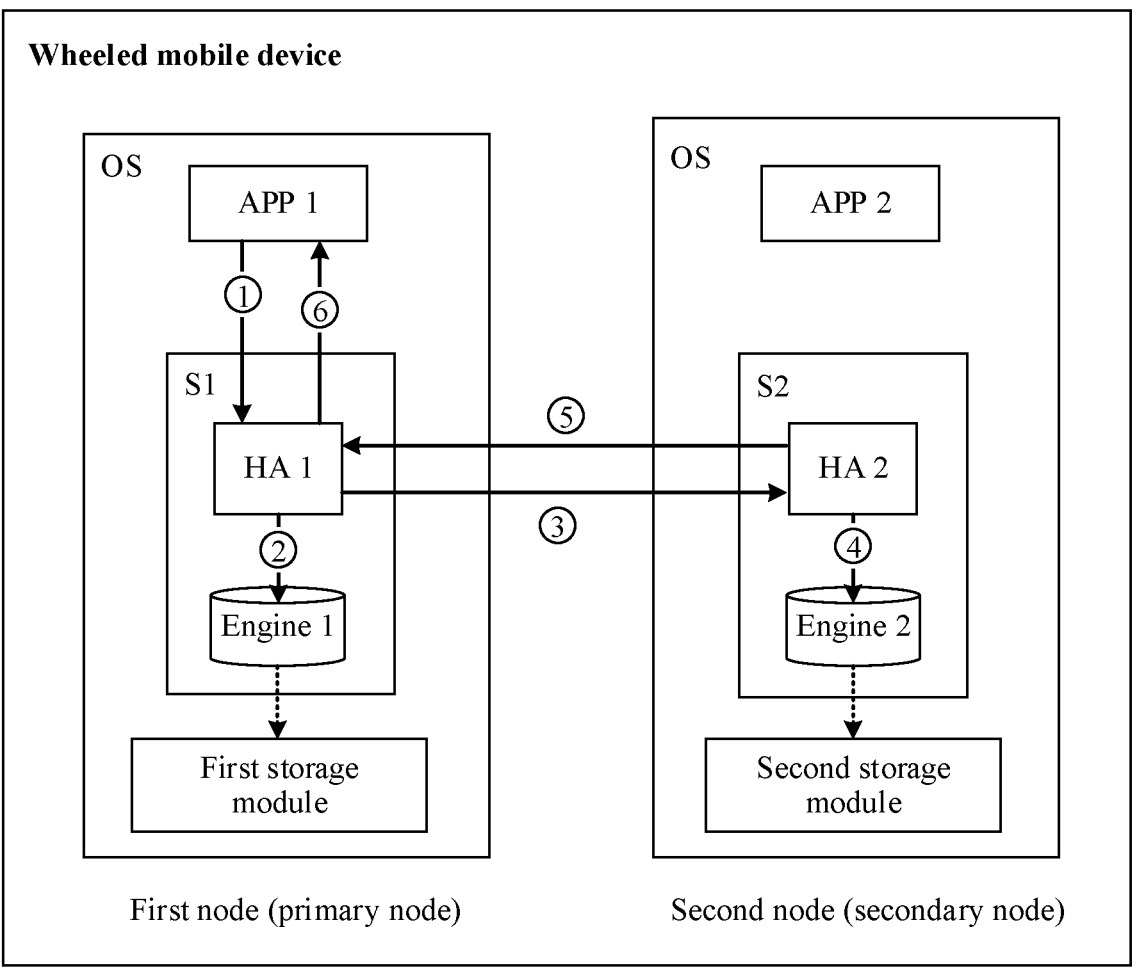
FIG. 4 is another schematic flowchart of a data storage method according to an embodiment of this application.

For ease of understanding the implementations corresponding to FIG. 3, the following illustrates the procedure from step 301 to step 306 from a perspective of an information flow. For details, refer to FIG. 4. FIG. 4 is another schematic flowchart of the data storage method according to an embodiment of this application. The first node serves as a primary node, the second node serves as a secondary node, and both are deployed on a wheeled mobile device. The first node has a first storage module configured to store data. An APP 1 and a first process S1 further run on the first node (actually, a plurality of APPs may run at the same time, and only one APP is used as an example for illustration in FIG. 4). The first process S1 includes a first database engine (namely, an engine 1 in FIG. 4), and a control component HA 1 is disposed on the engine 1. The control component HA 1 is configured to implement a procedure of transferring related information in step 301 to step 306. Similarly, the second node has a second storage module configured to store data. An APP 2 and a second process S2 further run on the second node (actually, a plurality of APPs may run at the same time, and only one APP is used as an example for illustration in FIG. 4). The second process S2 includes a second database engine (namely, an engine 2 in FIG. 4), and a control component HA 2 is disposed on the engine 2. The control component HA 2 is configured to implement a procedure of transferring various types of related information in step 301 to step 306. In an example, a data write procedure initiated by the APP 1 on the primary node may be as follows.

Step 1: The APP 1 on the first node sends a request a to the control component HA 1 on the first process through a service interface C1, where the request a is used to indicate to write data A to a storage module.

Step 2: Serving as the primary node, the first node invokes the engine 1 to write the data A to the first storage module, and records a current data version number M.

Step 3: After the data A is successfully written to the first storage module, the control component HA 1 sends the first request to the control component HA 2 of the second node, where the first request is usually included in a heartbeat sent by the first node to the second node (or may be separately sent, which is not limited herein).

Step 4: Serving as the secondary node, the second node invokes the engine 2 to write the data A to the second storage module, and also records the current data version number M.

Step 5: If the data A is successfully written to the second storage module, the second node sends a response message (namely, the foregoing first response message) to the control component HA 1 of the first node through the control component HA 2.

Step 6: When the first node receives the first response message within preset duration (for example, within 3 s), it indicates that the data A is successfully written to the second storage module, so that the first node returns an execution result to the APP 1 through the control component HA 1, where the execution result is the foregoing second response message, and is used to notify the APP 1 that both the first node and the second node complete the write operation on the data A.

It should be noted that, in some implementations of this application, selections of the engine 1 and the engine 2 are completely independent of each other, and do not strongly depend on each other. In other words, the engine 1 and the engine 2 may be homogeneous database engines or heterogeneous data storage engines. This is not limited herein. An adaptation module is integrated in each of the control component HA 1 and the control component HA 2, and is configured to adapt to various database engines, that is, mask differences between the database engines by using the respective control component. Different database engines have different resource consumption and performance. Therefore, the database engines may run on differentiated hardware (for example, a piece of high-configuration hardware and a piece of low-configuration hardware). If the engine 1 and the engine 2 are heterogeneous database engines, the engine with good performance usually runs on the primary node with a high configuration, and the engine with weak performance runs on the secondary node with a low configuration. This differentiated deployment is also based on cost reduction considerations.

In the foregoing implementations of this application, on a premise that only two nodes are deployed on the wheeled mobile device (for example, an autonomous vehicle), when the APP 1 sending the request a to the first node (serving as the primary node) and the first process S1 on the first node both run on the same OS, real-time data backup is implemented by using the foregoing strong-consistency data synchronization procedure, thereby ensuring data reliability. In addition, hardware costs of the wheeled mobile device are reduced. In other words, high-reliability data storage is implemented in a hardware architecture of a low-cost wheeled mobile device.

Figure 5:
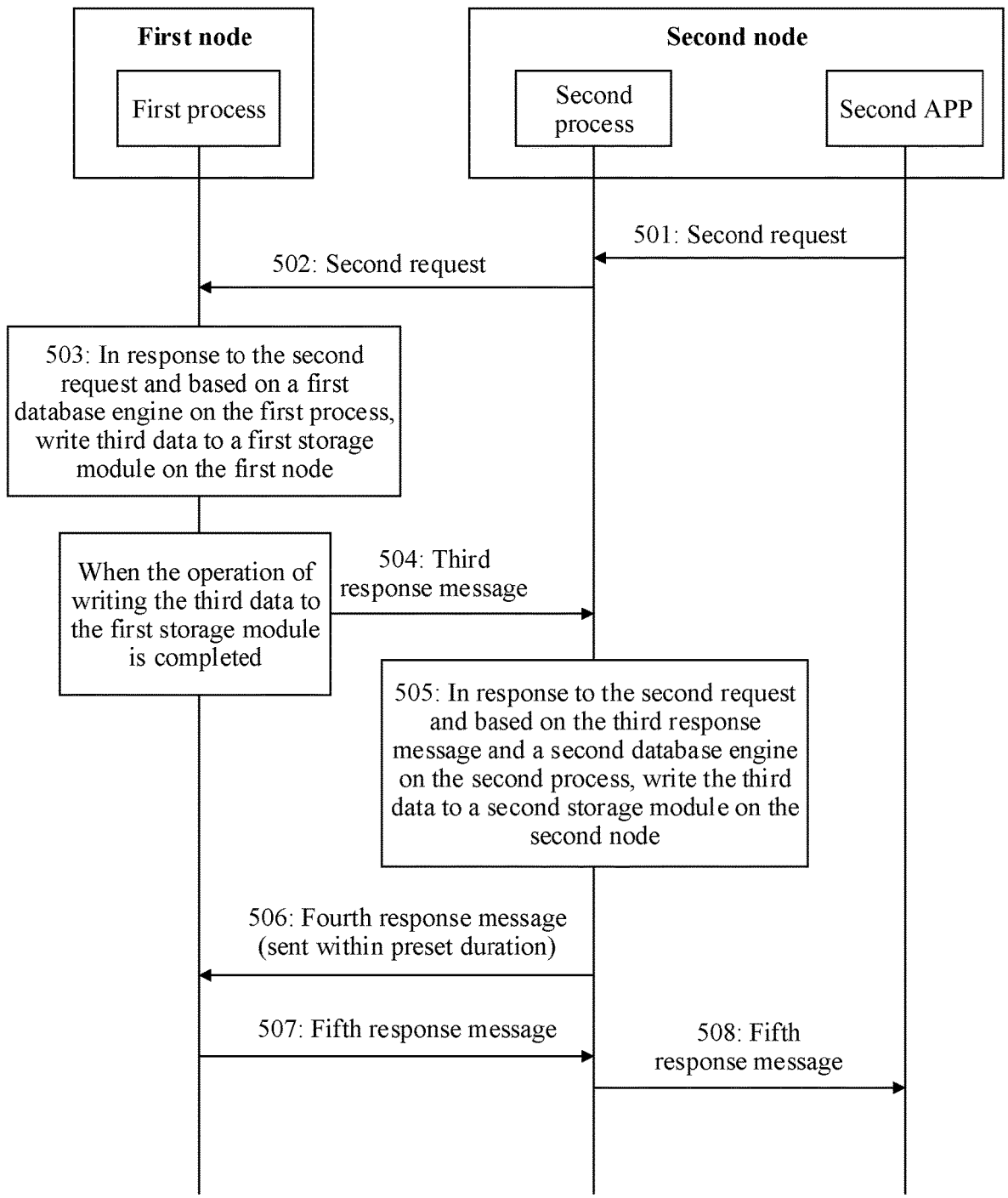
FIG. 5 is another schematic flowchart of a data storage method according to an embodiment of this application.

It should be noted that, in the foregoing embodiments corresponding to FIG. 3 and FIG. 4, the APP sending the first request to the first node and the first process both run on the same OS. Therefore, when an APP initiating a request and the first process do not run on the same OS, a data synchronization manner of the first storage module on the first node is different from that of the second storage module on the second node. Detailed descriptions are provided below. For details, refer to FIG. 5. Similarly, the method is applied to a wheeled mobile device (for example, an autonomous vehicle). The wheeled mobile device includes two nodes such as a first node (namely, a primary node) and a second node (namely, a secondary node). In this embodiment of this application, a second APP and a first process running on different OSs generally means that the second APP and the first process run on different nodes. In this embodiment of this application, the second APP runs on the second node. FIG. 5 is another schematic flowchart of the data storage method according to an embodiment of this application. The method may include the following steps.

501: The second node receives, by using a second process running on the second node, a second request sent by the second APP.

First, serving as the secondary node, the second node receives, by using the second process running on the second node, the second request sent by the second APP. The second process is a process related to data storage processing, and the second APP is configured to obtain related information. The related information may be running data of each system of the wheeled mobile device or perception information of an ambient environment of the wheeled mobile device (for example, the perception information may be obtained through a camera, a radar, or another sensor deployed on the wheeled mobile device). This is not limited herein. It is assumed that the second APP obtains the perception information. In this case, the second APP may generate a data operation instruction (namely, the second request) based on the perception information. The second request is sent by the second APP to the second process running on the second node corresponding to the second APP. In this embodiment of this application, the second request is used to indicate to write target data (which may be referred to as third data) to a storage module (for example, a hard disk or a memory).

It should be noted that, in the solution of this embodiment of this application, because the data operation instruction of the APP includes only performing a data write operation on the storage module, the second request is used to indicate to write the third data to the storage module. If data writing is to "add" data, the third data is data that needs to be added to the storage module, and the third data is included in the second request and sent by the second APP to the second node. If data writing is to "delete" data, the third data is corresponding to-be-deleted data in the storage module, and related identification information used to indicate the third data is included in the second request and sent by the second APP to the second node. If data writing is to "modify" data, the third data is corresponding to-be-modified data in the storage module, and modification information and related identification information corresponding to the third data are also included in the second request and sent by the second APP to the second node.

It should be further noted that, in some implementations of this application, the second process is a process related to data storage processing. Another process may also run on the second node at the same time, and different processes process different objects. Generally, only one process related to data storage processing runs on a node.

502: The first node receives, by using the first process running on the first node, the second request forwarded by the second process running on the second node.

In this embodiment of this application, the second node is used as the secondary node. Therefore, after receiving the second request sent by the corresponding second APP, the second node needs to forward the second request to the first node serving as the primary node for processing. In an example, the first node receives, by using the first process running on the first node, the second request forwarded by the second process running on the second node.

503: In response to the second request and based on a first database engine on the first process, the first node writes the third data to a first storage module on the first node by using the first process.

The first node obtains the second request sent by the first APP, and may invoke, based on the second request by using the first process, the first database engine on the first process to write third data to the first storage module on the first node.

It should be noted herein that the second request is used to indicate to write the third data to a storage module, but the storage module to which the third data is written is not limited. For example, if the first node invokes the first database engine by using the first process, the third data is written to the first storage module on the first node based on the second request. For another example, if the second node invokes a second database engine by using the second process, the third data is written to a second storage module on the second node based on the second request.

It should be noted that, in some implementations of this application, after the operation of writing the third data to the first storage module on the first node by invoking the first database engine by using the first process is completed, the first node may further record (for example, update) a current data version number by using the first process. The current data version number may be referred to as a first data version number, and is used to indicate an updated data version (which may be referred to as a first data version) of data in the first storage module. The updated data version is a data version obtained when the operation of writing the third data to the first storage module is completed. For example, it is assumed that a data version number before a current data write operation is X. In this case, after the current write operation is performed on the third data, data currently in the first storage module is of the latest version, and a data version number may be recorded as X+1. In this way, it is convenient to find which version of data is updated each time, which data is updated, or the like.

504: When the operation of writing the third data to the first storage module is completed, the first node sends a third response message to the second node by using the first process.

When the operation of writing the third data to the first storage module is completed, the first node sends the third response message to the second node by using the first process. The third response message is used to indicate the second node to invoke, by using the second process, the second database engine on the second process to write the third data to the second storage module on the second node based on the second request.

It should be noted that, in some implementations of this application, the second request may be included in the third response message and sent by the first process on the first node to the second process on the second node. This has the following advantages. Although the second node initially receives the second request sent by the second APP, in an actual processing procedure, the second node may need to process different requests on many different processes at the same time, and each request is not always kept on the node. Therefore, for ease of management, after the second request is forwarded to the first node, the second node may delete the second request. In this case, the third response message sent by the first node to the second node by using the first process may include the second request, so that the second node also writes the third data to the second storage module on the second node based on the second request.

It should be further noted that, in some implementations of this application, the third response message does not include the second request (provided that the second request still exists on the second node). In this case, the third response message is only used to indicate the second node to invoke the second database engine by using the second process to write the third data to the second storage module based on the existing second request of the second node.

505: Based on the third response message and in response to the second request, the second node writes the third data to the second storage module on the second node by invoking the second database engine on the second process.

After receiving the second request sent by the first node by using the first process, the second node writes the third data to the second storage module on the second node by invoking the second database engine on the second process. In this way, updated data in the second storage module on the second node can be completely consistent with updated data in the first storage module. Similar to the first process, the second process is also a process related to data storage processing.

It should be noted that, in some implementations of this application, similar to the first node, after the operation of writing the third data to the second storage module on the second node by invoking the second database engine by using the second process is completed, the second node may further record (for example, update) a current data version number by using the second process. The current data version number may be referred to as a second data version number, and is used to indicate an updated data version (which may be referred to as a second data version) of data in the second storage module. The updated data version is a data version obtained when the operation of writing the third data to the second storage module is completed. For example, it is assumed that a data version number before a current data write operation is Y. In this case, after the current write operation is performed on the third data, data currently in the second storage module is of the latest version, and a data version number may be recorded as Y+1.

In this way, it is convenient to find which version of data is updated each time, which data is updated, or the like. It should be noted herein that each time the node performs a write operation on the data, the first storage module on the first node and the second storage module on the second node are updated synchronously. Therefore, values of X and Y are substantially the same.

506: The first node receives, within preset duration by using the first process, a fourth response message sent by the second node by using the second process.

When writing the third data to the second storage module on the second node by invoking the second database engine on the second process is completed, the second node sends the fourth response message to the first node by using the second process. The fourth response message is used to indicate that writing the third data to the second storage module is completed.

507: The first node sends a fifth response message to the second node by using the first process.

When the first node receives, within preset duration by using the first process, the fourth response message sent by the second node by using the second process, the first node sends a fifth response message to the second node by using the first process. The fifth response message is used to indicate that both the operation of writing the third data to the first storage module and the operation of writing the third data to the second storage module are completed.

It should be noted that, in some implementations of this application, the first storage module and the second storage module each may be a hard disk or an in-memory database. This is not limited herein. In this embodiment of this application, both the first storage module and the second storage module may be in-memory databases. For example, the first storage module is a first in-memory database, and the second storage module is a second in-memory database. This is because, compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

508: The second node forwards the fifth response message to the second application by using the second process.

The second node receives, by using the second process, the fifth response message sent by the first node by using the first process, and forwards the fifth response message to the second application. In this way, the second application may also perceive that both the first node and the second node complete the write operation on the third data.

It should be noted that in this embodiment of this application, because the first node is the primary node, all response messages sent to the APP need to be sent by the first node. Therefore, the first node needs to send the fifth response message to the second node, and then the second node forwards the fifth response message to the second application.

It should be further noted that, in this embodiment of this application, regardless of the first request sent by the first APP or the second request sent by the second APP, it is required that the first node first writes data to the first storage module by using the first process, and after the write operation performed on the first storage module succeeds, the second node writes the data to the second storage module by using the second process. This is to ensure strong consistency of data update. For example, it is assumed that an APP corresponding to the first process sends a request A, and an APP corresponding to the second process sends a request B at the same time. If both the nodes first write the data locally, a data update sequence on the first storage module on the first node is A→B, and a data update sequence on the second storage module on the second node is B→A. Data of the two storage modules is inconsistent in a specific time period, and data version numbers cannot be in correspondence.

In the foregoing implementations of this application, on a premise that only two nodes are deployed on the wheeled mobile device (for example, an autonomous vehicle), when the APP sending the second request to the second node (serving as the secondary node) and the first process on the first node run on different OSs, real-time data backup is implemented by using the foregoing strong-consistency data synchronization procedure, thereby ensuring data reliability. In addition, hardware costs of the wheeled mobile device are reduced. In other words, high-reliability data storage is implemented in a hardware architecture of a low-cost wheeled mobile device.

Figure 6:
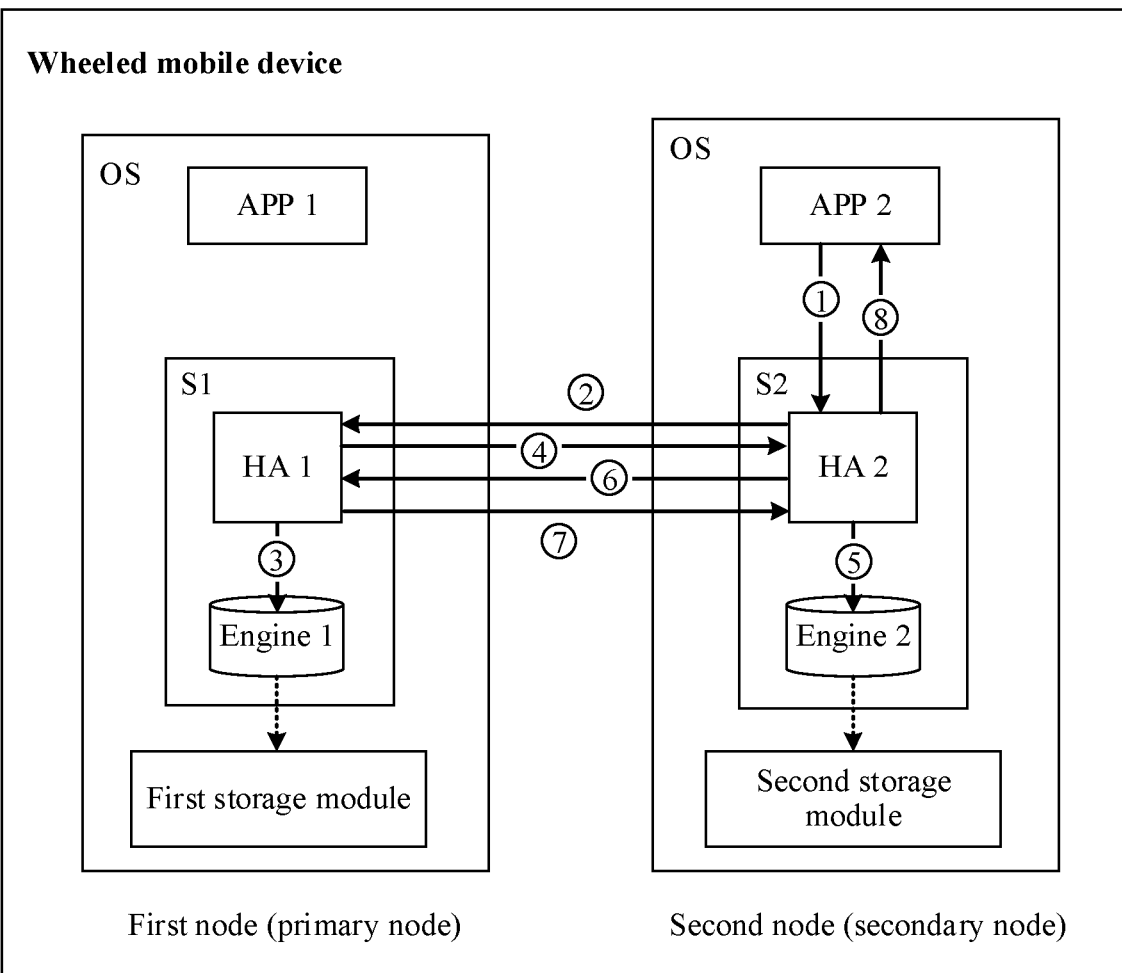
FIG. 6 is another schematic flowchart of a data storage method according to an embodiment of this application.

For ease of understanding the implementations corresponding to FIG. 5, the following illustrates the procedure from step 501 to step 508 from a perspective of an information flow. For details, refer to FIG. 6. FIG. 6 is another schematic flowchart of the data storage method according to an embodiment of this application. The first node serves as a primary node, the second node serves as a secondary node, and both are deployed on a wheeled mobile device. The first node has a first storage module configured to store data. An APP 1 and a first process S1 further run on the first node (actually, a plurality of APPs may run at the same time, and only one APP is used as an example for illustration in FIG. 6). The first process S1 includes a first database engine (namely, an engine 1 in FIG. 6), and a control component HA 1 is disposed on the engine 1. The control component HA 1 is configured to implement a procedure of transferring related information in step 501 to step 508. Similarly, the second node has a second storage module configured to store data. An APP 2 and a second process S2 further run on the second node (actually, a plurality of APPs may run at the same time, and only one APP is used as an example for illustration in FIG. 6). The second process S2 includes a second database engine (namely, an engine 2 in FIG. 6), and a control component HA 2 is disposed on the engine 2. The control component HA 2 is configured to implement a procedure of transferring various types of related information in step 501 to step 508. In an example, a data write procedure initiated by the APP 2 on the secondary node may be as follows.

Step 1: The APP 2 on the second node sends a request b to the control component HA 2 on the second process through a service interface C2, where the request b is used to indicate to write data B to a storage module.

Step 2: Serving as the secondary node, the second node forwards, through the control component HA 2, the request b to the first node serving as the primary node for processing.

Step 3: Serving as the primary node, the first node receives, through the control component HA 1, the request b sent by the second node, invokes the engine 1 to write the data B to the first storage module, and records a current data version number N.

Step 4: After the data B is successfully written to the first storage module, the control component HA 1 sends a response message x (namely, the foregoing third response message) to the control component HA 2 of the second node, where the response message x may include the request b, the response message x is used to indicate the second node to invoke the engine 2 to write the data B to the second storage module based on the request b, and the response message x is usually included in a heartbeat sent by the first node to the second node (or may be separately sent, which is not limited herein).

Step 5: Serving as the secondary node, the second node invokes the engine 2 to perform an operation of writing the data B to the second storage module, and also records a current data version number N.

Step 6: If the data B is successfully written to the second storage module, the second node sends a response message y (namely, the foregoing fourth response message) to the control component HA 1 of the first node through the control component HA 2.

Step 7: When the first node receives the response message y within preset duration (for example, within 3 seconds), it indicates that the data B is successfully written to the second storage module, so that the first node returns a response message z (namely, the foregoing fifth response message) to the second node through the control component HA 1, to notify the second node that both parties complete the write operation on the data B.

Step 8: After receiving the response message z sent by the first node, the second node returns an execution result to the APP 2, where the execution result is the response message z, and is used to notify the APP 2 that both the first node and the second node complete the write operation on the data B.

It should be noted that, in some implementations of this application, similarly, selections of the engine 1 and the engine 2 are completely independent of each other, and do not strongly depend on each other. In other words, the engine 1 and the engine 2 may be homogeneous database engines or heterogeneous data storage engines. This is not limited herein. An adaptation module is integrated in each of the control component HA 1 and the control component HA 2, and is configured to adapt to various database engines, that is, mask differences between the database engines by using the respective control component. Different database engines have different resource consumption and performance. Therefore, the database engines may run on differentiated hardware (for example, a piece of high-configuration hardware and a piece of low-configuration hardware). If the engine 1 and the engine 2 are heterogeneous database engines, the engine with good performance usually runs on the primary node with a high configuration, and the engine with weak performance runs on the secondary node with a low configuration. This differentiated deployment is also based on cost reduction considerations.

In the foregoing implementations of this application, on a premise that only two nodes are deployed on the wheeled mobile device (for example, an autonomous vehicle, an intelligent vehicle, or a connected vehicle), when the APP 2 sending the request b to the second node (serving as the secondary node) and the first process S1 on the first node run on different OSs, real-time data backup is implemented by using the foregoing strong-consistency data synchronization procedure (for example, data in a first node device and a second node device in a system is the same at any moment), thereby ensuring data reliability. In addition, compared with a manner in which at least three nodes are deployed in the conventional technology, a manner in which two nodes are deployed in this application reduces hardware costs of the wheeled mobile device. In other words, high-reliability data storage is implemented in a hardware architecture of a low-cost wheeled mobile device.

It should be noted that, in the embodiments of this application, a reason why the primary node and the secondary node need to back up data is to ensure that if one node is faulty, the other node storing the same data may continue to provide a service for the wheeled mobile device based on the data, so as to ensure availability and no data loss. Based on this, in some implementations of this application, if a node is faulty, another node continues to run in a single-server mode. To improve availability, in the embodiments of this application, internal and external detection results are integrated to quickly perceive the fault. Because faulty nodes are different, processing manners are accordingly different. Descriptions are separately provided below.

(1) The first node (primary node) is faulty.

In the implementation corresponding to any one of FIG. 3 to FIG. 6, if the first node is faulty, the second node immediately replaces the first node to continue to provide the service, and caches data. The cached data is data updated in the second storage module after the second node replaces the first node as the primary node. In addition, after the first node recovers to normal use, the cached data is sent to the first node by using the second process, so that the first node updates the cached data to the first storage module of the first node by invoking the first database engine, to implement data synchronization between the two nodes.

It should be noted that, in some implementations of this application, determining that the first node is faulty may include the following several manners.

a. A heartbeat sent by the first node to the second node is abnormal. For example, it is assumed that a frequency at which the first node sends the heartbeat to the second node is normally once every 300 milliseconds. The first node sends the heartbeat to the second node is to notify the second node that the first node runs normally, but if the second node does not receive, within preset duration (for example, within 1 second), the heartbeat sent by the first node, the second node considers that the first node is faulty.

b. The first node actively sends a fault notification message to the second node. For example, when software on the first process running on the first node normally or abnormally exits, the first node actively sends the fault notification message to the second node. For another example, when a third process monitoring the first process on the first node detects that the first process is abnormal, the first node also actively sends the fault notification message to the second node. For another example, if communication of the first node is abnormal, the first node also actively sends the fault notification message to the second node. No specific example is given for description herein. Compared with the manner a, the manner b can enable the second node to more quickly perceive that a fault occurs on the first node. Before determining that the first node is faulty, the second node does not need to wait for the preset duration without receiving the heartbeat from the first node, so as to further shorten a fault detection delay.

It should be further noted that, in some implementations of this application, the second node may replace the first node in the following several replacement manners to continue to provide the service.

a. The second node replaces the first node to provide the service until the first node recovers to normal use. In other words, the second node does not replace the first node after the first node recovers to normal use, and the second node still works as the secondary node. Generally, in this case, the first node has a high configuration, and the second node has a low configuration. In an example, hardware configurations of the first node and the second node are different, and a primary database engine runs on the high-configuration first node. When the high-configuration first node is faulty, the low-configuration second node may replace the first node to provide the service in a short period of time. After the first node recovers to normal use, the first node continues to provide the service as the primary node. This manner of setting the nodes with high and low configurations is also for cost reduction.

b. The second node always replaces the first node to provide the service. In an example, after the second node replaces the first node to provide the service as the primary node, the second node always serves as the primary node to provide the service regardless of whether the first node recovers to normal use subsequently. If the first node recovers to normal use later, the first node always serves as the secondary node. Generally, this always-replace manner is used when hardware configurations of the first node and the second node are not different.

(2) The second node (secondary node) is faulty.

In the implementation corresponding to any one of FIG. 3 to FIG. 6, if the second node is faulty, the first node may set a state of the second node to an abnormal state, and the first node continues to provide the service as the primary node, and caches data (for example, the second data described in FIG. 3 and FIG. 4 or the fourth data described in FIG. 5 and FIG. 6). The cached data is data obtained after the first node writes data (for example, the first data or the third data) to the first storage module by using the first process. In addition, after the second node recovers to normal use, the cached data is sent to the second node by using the first process, so that the second node updates the cached data to the second storage module of the second node by invoking the second database engine, to implement data synchronization between the two nodes.

It should be noted that, in some implementations of this application, there may be an upper limit on an amount of cached data. When the amount of cached data reaches the upper limit, the earliest cached data is discarded according to a sequence. This is because a capacity of the storage module is limited, and the earliest cached data has to be deleted, to ensure that the latest data can be stored in the storage module.

Similarly, in some implementations of this application, determining that the second node is faulty may also include the following several manners.

a. A heartbeat sent by the second node to the first node is abnormal. For example, it is assumed that a frequency at which the second node sends the heartbeat to the first node is normally once every 300 milliseconds. The second node sends the heartbeat to the first node is also to notify the first node that the second node runs normally, but if the first node does not receive, within preset duration (for example, within 1 second), the heartbeat sent by the second node, the first node considers that the second node is faulty.

b. The second node actively sends a fault notification message to the first node. For example, when software on the second process running on the second node normally or abnormally exits, the second node actively sends the fault notification message to the first node. For another example, when a fourth process monitoring the second process on the second node detects that the second process is abnormal, the second node also actively sends the fault notification message to the first node. For another example, if communication of the second node is abnormal, the second node also actively sends the fault notification message to the first node. No specific example is given for description herein. Compared with the manner a, the manner b can enable the first node to more quickly perceive that a fault occurs on the second node. Before determining that the second node is faulty, the first node does not need to wait for the preset duration without receiving the heartbeat from the second node, so as to further shorten a fault detection delay.

It should be further noted that, in the foregoing implementations of this application, regardless of whether the first node is faulty or the second node is faulty, after the faulty end is restarted and recovered, both the first node and the second node need to perform data synchronization. The data synchronization includes two manners such as incremental synchronization and full synchronization. Based on a data version number, incremental synchronization is preferentially performed (that is, only cached data is sent to the peer end). If the cached data is insufficient, full synchronization is performed (for example, if a failure lasts for a long time, most data may be updated, and therefore, all data in the storage module is directly synchronized).

Figure 7:
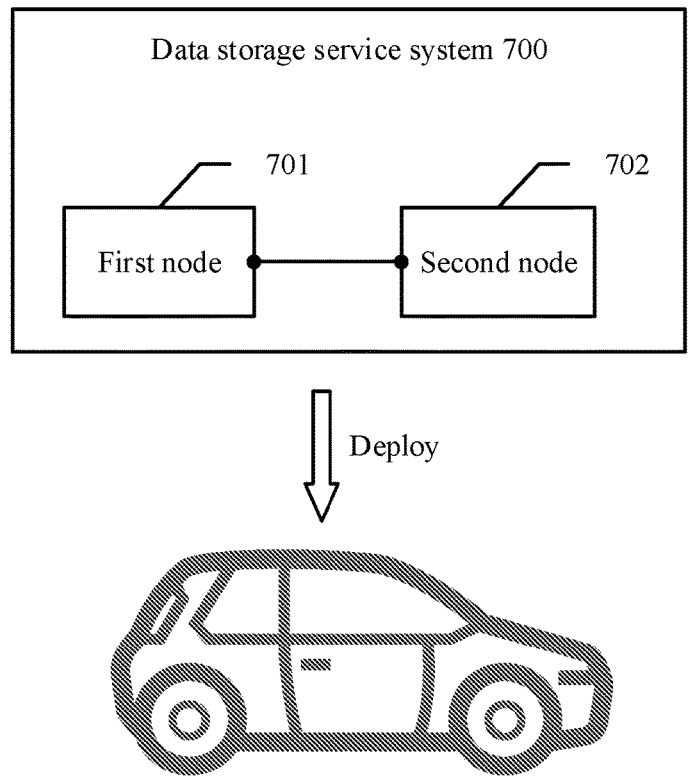
FIG. 7 is a schematic diagram of a structure of a data storage service system according to an embodiment of this application.

Based on the embodiments corresponding to FIG. 3 to FIG. 6, to better implement the foregoing solutions in the embodiments of this application, the following further provides a related device configured to implement the foregoing solutions. For details, refer to FIG. 7. FIG. 7 is a schematic diagram of a structure of a data storage service system 700 according to an embodiment of this application. The data storage service system 700 is deployed on a wheeled mobile device (for example, an autonomous vehicle), and the data storage service system 700 includes a first node 701 and a second node 702. The first node 701 is a primary node, and the second node 702 is a secondary node.

When the data storage service system 700 is configured to implement the embodiments corresponding to FIG. 3 and FIG. 4, the first node 701 is configured to receive, by using a first process running on the first node 701, a first request sent by a first application corresponding to the first process. The first request is used to indicate to write first data to a storage module. The first node 701 is further configured to invoke, in response to the first request by using the first process, a first database engine on the first process to write the first data to a first storage module on the first node 701. The first node 701 is further configured to, when writing the first data to the first storage module is completed, send the first request to the second node 702 by using the first process. The second node 702 is configured to write the first data to a second storage module on the second node 702 based on the first request by invoking a second database engine on a second process. The second process runs on the second node 702. The first node 701 is further configured to, when the first node 701 receives, within preset duration by using the first process, a first response message sent by the second node 702 by using the second process, send a second response message to the first application by using the first process. The first response message is used to indicate that the operation of writing the first data to the second storage module is completed, and the second response message is used to indicate that both writing the first data to the first storage module and writing the first data to the second storage module are completed.

In the foregoing implementation of this application, on a premise that only two nodes are deployed on the data storage service system 700 deployed on the wheeled mobile device (for example, an autonomous vehicle, an intelligent vehicle, or a connected vehicle), when the APP sending the first request to the first node 701 (serving as the primary node) and the first process on the first node 701 run on a same OS, real-time data backup is implemented by using the foregoing strong-consistency data synchronization procedure, thereby ensuring data reliability. In addition, compared with a manner in which at least three nodes are deployed in the conventional technology, a manner in which two nodes are deployed in this application reduces hardware costs of the wheeled mobile device. In other words, high-reliability data storage is implemented in a hardware architecture of a low-cost wheeled mobile device.

In a possible design, the second node 702 is further configured to, when the first node 701 is faulty, replace the first node 701 to provide a service, and cache data. The cached data is data updated in the second storage module after the second node 702 replaces the first node 701 as a primary node. In addition, after the first node 701 recovers to normal use, the cached data is sent to the first node 701 by using the second process, so that the first node 701 updates the cached data to the first storage module of the first node 701 by invoking the first database engine, to implement data synchronization between the two nodes.

In the foregoing implementation of this application, if the first node 701 is faulty (where the first node 701 serves as the primary node and the second node 702 serves as the secondary node), the second node 702 immediately becomes the primary node and replaces the first node 701 to perform the service, to ensure availability of the data storage service system and avoid data loss.

In a possible design, the second node 702 is configured to replace the first node 701 to provide the service until the first node 701 recovers to normal use, or always replace the first node 701 to provide the service. In an example, in the first replacement manner, the second node 702 does not replace the first node 701 after the first node 701 recovers to normal use, and the second node 702 still works as the secondary node. Generally, in this case, the first node 701 has a high configuration, and the second node 702 has a low configuration. In an example, hardware configurations of the first node 701 and the second node 702 are different, and a primary database engine runs on the high-configuration first node 701. When the high-configuration first node 701 is faulty, the low-configuration second node 702 may replace the first node 701 to provide the service in a short period of time. After the first node 701 recovers to normal use, the first node 701 continues to provide the service as the primary node. This manner of setting the nodes with high and low configurations is also for cost reduction. In the second replacement manner, after the second node 702 replaces the first node 701 to provide the service as the primary node, the second node 702 always serves as the primary node to provide the service regardless of whether the first node 701 recovers to normal use subsequently. If the first node 701 recovers to normal use later, the first node 701 always serves as the secondary node. Generally, this always-replace manner is used when hardware configurations of the first node 701 and the second node 702 are not different.

In the foregoing implementation of this application, two manners in which the second node 702 replaces the first node 701 to provide the service when the first node 701 is faulty are described, and the manners are flexible and optional.

In a possible design, the first node 701 being faulty includes that a heartbeat sent by the first node 701 to the second node 702 is abnormal, or the first node 701 sends a fault notification message to the second node 702. For example, it is assumed that a frequency at which the first node 701 sends the heartbeat to the second node 702 is normally once every 300 milliseconds. The first node 701 sends the heartbeat to the second node 702 is to notify the second node 702 that the first node 701 runs normally, but if the second node 702 does not receive, within preset duration (for example, within 1 second), the heartbeat sent by the first node 701, the second node 702 considers that the first node 701 is faulty. For example, when software on the first process running on the first node 701 normally or abnormally exits, the first node 701 actively sends the fault notification message to the second node 702. For another example, when a third process monitoring the first process on the first node 701 detects that the first process is abnormal, the first node 701 also actively sends the fault notification message to the second node 702. For another example, if communication of the first node 701 is abnormal, the first node 701 also actively sends the fault notification message to the second node 702. No specific example is given for description herein.

In the foregoing implementation of this application, the foregoing two fault perception manners are to enable the second node 702 to quickly perceive that a fault occurs on the first node 701, thereby shortening a fault detection delay. Compared with the first fault perception manner, the second fault perception manner can enable the second node 702 to more quickly perceive that a fault occurs on the first node 701. Before determining that the first node 701 is faulty, the second node 702 does not need to wait for the preset duration without receiving the heartbeat from the first node 701, so as to further shorten the fault detection delay.

In a possible design, the first node 701 is further configured to, when the second node 702 is faulty, set a state of the second node 702 to an abnormal state, cache second data, and send the second data to the second node 702 by using the first process after the second node 702 recovers to normal use. The second node 702 is further configured to update the second data to the second storage module by invoking the second database engine, where the second data is data obtained after the first node 701 writes the first data to the first storage module by using the first process.

As described in the foregoing implementation of this application, if the second node 702 is faulty, the first node 701 continues to provide the service as the primary node, and after the second node 702 recovers to normal use, the cached second data is sent to the second node 702 by using the first process, so that the second node 702 updates the cached second data to the second storage module of the second node 702 by invoking the second database engine, to implement data synchronization between the two nodes. This is implementable.

In a possible design, the second node 702 being faulty includes that a heartbeat sent by the second node 702 to the first node 701 is abnormal, or the second node 702 sends a fault notification message to the first node 701. For example, it is assumed that a frequency at which the second node 702 sends the heartbeat to the first node 701 is normally once every 300 milliseconds. The second node 702 sends the heartbeat to the first node 701 is to notify the first node 701 that the second node 702 runs normally, but if the first node 701 does not receive, within preset duration (for example, within 1 second), the heartbeat sent by the second node 702, the first node 701 considers that the second node 702 is faulty. For example, when software on the second process running on the second node 702 normally or abnormally exits, the second node 702 actively sends the fault notification message to the first node 701. For another example, when a fourth process monitoring the second process on the second node 702 detects that the second process is abnormal, the second node 702 also actively sends the fault notification message to the first node 701. For another example, if communication of the second node 702 is abnormal, the second node 702 also actively sends the fault notification message to the first node 701. No specific example is given for description herein.

In the foregoing implementation of this application, the foregoing two fault perception manners are to enable the first node 701 to quickly perceive that a fault occurs on the second node 702, thereby shortening a fault detection delay. Compared with the first fault perception manner, the second fault perception manner can enable the first node 701 to more quickly perceive that a fault occurs on the second node 702. Before determining that the second node 702 is faulty, the first node 701 does not need to wait for the preset duration without receiving the heartbeat from the second node 702, so as to further shorten the fault detection delay.

In a possible design, the first storage module includes a first in-memory database, and/or the second storage module includes a second in-memory database.

As described in the foregoing implementation of this application, the first storage module and the second storage module may be in-memory databases. Compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

In a possible design, the first node 701 is further configured to record a first data version number by using the first process. The first data version number is used to indicate an updated data version (which may be referred to as a first data version) of data in the first storage module. The updated data version is a data version obtained when the operation of writing the first data to the first storage module is completed.

In the foregoing implementation of this application, after the write operation is performed on the first data by using the first process, a current updated data version number further needs to be recorded. In this way, it is convenient to find which version of data is updated each time, which data is updated, or the like.

In a possible design, the second node 702 is further configured to record a second data version number by using the second process. The second data version number is used to indicate an updated data version (which may be referred to as a second data version) of data in the second storage module. The updated data version is a data version obtained when the operation of writing the first data to the second storage module is completed.

In the foregoing implementation of this application, after the write operation is performed on the first data by using the second process, a current updated data version number also needs to be recorded. In this way, it is convenient to find which version of data is updated each time, which data is updated, or the like.

In a possible design, the wheeled mobile device on which the data storage service system 700 is deployed may be an autonomous vehicle, and the autonomous vehicle may be a car, a playground vehicle, a construction device, a tram, a golf cart, a train, a cart, or the like. This is not limited in this embodiment of this application.

As described in the foregoing implementation of this application, the wheeled mobile device may be an autonomous vehicle. This is implementable.

In addition, when the data storage service system 700 is configured to implement the embodiments corresponding to FIG. 5 and FIG. 6, the second node 702 is configured to receive, by using a second process running on the second node 702, a second request sent by a second application corresponding to the second process. The second request is used to indicate to write third data to a storage module. The first node 701 is configured to receive, by using a first process running on the first node 701, the second request forwarded by the second node 702 by using the second process. The first node 701 is further configured to invoke, in response to the second request by using the first process, a first database engine on the first process to write the third data to a first storage module of the first node 701. The first node 701 is further configured to, when the operation of writing the third data to the first storage module is completed, send a third response message to the second node 702 by using the first process. The third response message is used to indicate the second node 702 to invoke, based on the second request by using the second process, a second database engine on the second process to write the third data to a second storage module of the second node 702. The second node 702 is further configured to invoke, based on the third response message and the second request by using the second process, the second database engine to write the third data to the second storage module. The first node 701 is further configured to, when the first node 701 receives, within preset duration by using the first process, a fourth response message sent by the second node 702 by using the second process, send a fifth response message to the second node 702 by using the first process. The fourth response message is used to indicate that the operation of writing the third data to the second storage module is completed, and the fifth response message is used to indicate that both the operation of writing the third data to the first storage module and the operation of writing the third data to the second storage module is completed. The second node 702 is further configured to forward the fifth response message to the second application by using the second process.

In the foregoing implementation of this application, on a premise that only two nodes are deployed on the data storage service system 700 deployed on the wheeled mobile device (for example, an autonomous vehicle), when the APP sending the second request to the second node 702 (serving as a secondary node) and the first process on the first node 701 run on different OSs, real-time data backup is implemented by using the foregoing strong-consistency data synchronization procedure, thereby ensuring data reliability. In addition, hardware costs of the wheeled mobile device are reduced. In other words, high-reliability data storage is implemented in a hardware architecture of a low-cost wheeled mobile device.

In a possible design, the second node 702 is further configured to, when the first node 701 is faulty, replace the first node 701 to provide a service, and cache data. The cached data is data updated in the second storage module after the second node 702 replaces the first node 701 as a primary node. In addition, after the first node 701 recovers to normal use, the cached data is sent to the first node 701 by using the second process, so that the first node 701 updates the cached data to the first storage module of the first node 701 by invoking the first database engine, to implement data synchronization between the two nodes.

In the foregoing implementation of this application, if the first node 701 is faulty (where the first node 701 serves as the primary node and the second node 702 serves as the secondary node), the second node 702 immediately becomes the primary node and replaces the first node 701 to perform the service, to ensure availability of the data storage service system and avoid data loss.

In a possible design, the second node 702 is configured to replace the first node 701 to provide the service until the first node 701 recovers to normal use, or always replace the first node 701 to provide the service. In an example, in the first replacement manner, the second node 702 does not replace the first node 701 after the first node 701 recovers to normal use, and the second node 702 still works as the secondary node. Generally, in this case, the first node 701 has a high configuration, and the second node 702 has a low configuration. In an example, hardware configurations of the first node 701 and the second node 702 are different, and a primary database engine runs on the high-configuration first node 701. When the high-configuration first node 701 is faulty, the low-configuration second node 702 may replace the first node 701 to provide the service in a short period of time. After the first node 701 recovers to normal use, the first node 701 continues to provide the service as the primary node. This manner of setting the nodes with high and low configurations is also for cost reduction. In the second replacement manner, after the second node 702 replaces the first node 701 to provide the service as the primary node, the second node 702 always serves as the primary node to provide the service regardless of whether the first node 701 recovers to normal use subsequently. If the first node 701 recovers to normal use later, the first node 701 always serves as the secondary node. Generally, this always-replace manner is used when hardware configurations of the first node 701 and the second node 702 are not different.

In the foregoing implementation of this application, two manners in which the second node 702 replaces the first node 701 to provide the service when the first node 701 is faulty are described, and the manners are flexible and optional.

In a possible design, the first node 701 being faulty includes that a heartbeat sent by the first node 701 to the second node 702 is abnormal, or the first node 701 sends a fault notification message to the second node 702. For example, it is assumed that a frequency at which the first node 701 sends the heartbeat to the second node 702 is normally once every 300 milliseconds. The first node 701 sends the heartbeat to the second node 702 is to notify the second node 702 that the first node 701 runs normally, but if the second node 702 does not receive, within preset duration (for example, within 1 second), the heartbeat sent by the first node 701, the second node 702 considers that the first node 701 is faulty. For example, when software on the first process running on the first node 701 normally or abnormally exits, the first node 701 actively sends the fault notification message to the second node 702. For another example, when a third process monitoring the first process on the first node 701 detects that the first process is abnormal, the first node 701 also actively sends the fault notification message to the second node 702. For another example, if communication of the first node 701 is abnormal, the first node 701 also actively sends the fault notification message to the second node 702. No specific example is given for description herein.

In the foregoing implementation of this application, the foregoing two fault perception manners are to enable the second node 702 to quickly perceive that a fault occurs on the first node 701, thereby shortening a fault detection delay. Compared with the first fault perception manner, the second fault perception manner can enable the second node 702 to more quickly perceive that a fault occurs on the first node

701. Before determining that the first node 701 is faulty, the second node 702 does not need to wait for the preset duration without receiving the heartbeat from the first node 701, so as to further shorten the fault detection delay.

In a possible design, the first node 701 is further configured to, when the second node 702 is faulty, set a state of the second node 702 to an abnormal state, cache fourth data, and send the fourth data to the second node 702 by using the first process after the second node 702 recovers to normal use. The second node 702 is further configured to update the fourth data to the second storage module by invoking the second database engine, where the fourth data is data obtained after the first node 701 writes the third data to the first storage module by using the first process.

As described in the foregoing implementation of this application, if the second node 702 is faulty, the first node 701 continues to provide the service as the primary node, and after the second node 702 recovers to normal use, the cached fourth data is sent to the second node 702 by using the first process, so that the second node 702 updates the cached fourth data to the second storage module of the second node 702 by invoking the second database engine, to implement data synchronization between the two nodes. This is implementable.

In a possible design, the second node 702 being faulty includes a heartbeat sent by the second node 702 to the first node 701 is abnormal, or the second node 702 sends a fault notification message to the first node 701. For example, it is assumed that a frequency at which the second node 702 sends the heartbeat to the first node 701 is normally once every 300 milliseconds. The second node 702 sends the heartbeat to the first node 701 is to notify the first node 701 that the second node 702 runs normally, but if the first node 701 does not receive, within preset duration (for example, within 1 second), the heartbeat sent by the second node 702, the first node 701 considers that the second node 702 is faulty. For example, when software on the second process running on the second node 702 normally or abnormally exits, the second node 702 actively sends the fault notification message to the first node 701. For another example, when a fourth process monitoring the second process on the second node 702 detects that the second process is abnormal, the second node 702 also actively sends the fault notification message to the first node 701. For another example, if communication of the second node 702 is abnormal, the second node 702 also actively sends the fault notification message to the first node 701. No specific example is given for description herein.

In the foregoing implementation of this application, the foregoing two fault perception manners are to enable the first node 701 to quickly perceive that a fault occurs on the second node 702, thereby shortening a fault detection delay. Compared with the first fault perception manner, the second fault perception manner can enable the first node 701 to more quickly perceive that a fault occurs on the second node 702. Before determining that the second node 702 is faulty, the first node 701 does not need to wait for the preset duration without receiving the heartbeat from the second node 702, so as to further shorten the fault detection delay.

In a possible design, the first storage module includes a first in-memory database, and/or the second storage module includes a second in-memory database.

As described in the foregoing implementation of this application, the first storage module and the second storage module may be in-memory databases. Compared with a conventional hard disk, a read speed of the in-memory database is faster, especially in the field of intelligent driving. Because data such as running status data, perception data, intermediate calculation results, and SOA information of a vehicle needs to be frequently read, if the first storage module and the second storage module are hard disks, repeated and frequent data reading/writing shortens a service life of the hard disk, resulting in higher replacement costs of a vehicle component.

In a possible design, the first node 701 is further configured to record a first data version number by using the first process. The first data version number is used to indicate an updated data version (which may be referred to as a first data version) of data in the first storage module. The updated data version is a data version obtained when the operation of writing the third data to the first storage module is completed.

In the foregoing implementation of this application, after the write operation is performed on the first data by using the first process, a current updated data version number further needs to be recorded. In this way, it is convenient to find which version of data is updated each time, which data is updated, or the like.

In a possible design, the second node 702 is further configured to record a second data version number by using the second process. The second data version number is used to indicate an updated data version (which may be referred to as a second data version) of data in the second storage module. The updated data version is a data version obtained when the operation of writing the third data to the second storage module is completed.

In the foregoing implementation of this application, after the write operation is performed on the first data by using the second process, a current updated data version number also needs to be recorded. In this way, it is convenient to find which version of data is updated each time, which data is updated, or the like.

In a possible design, the wheeled mobile device on which the data storage service system 700 is deployed may be an autonomous vehicle, and the autonomous vehicle may be a car, a playground vehicle, a construction device, a tram, a golf cart, a train, a cart, or the like. This is not limited in this embodiment of this application.

As described in the foregoing implementation of this application, the wheeled mobile device may be an autonomous vehicle. This is implementable.

It should be noted that content such as information exchange and an execution procedure between the modules/units described in the embodiment corresponding to FIG. 7 is based on a same concept as the method embodiments corresponding to FIG. 3 to FIG. 6 in this application. For example content, refer to the descriptions in the method embodiments in this application. Details are not described herein again.

Figure 8:
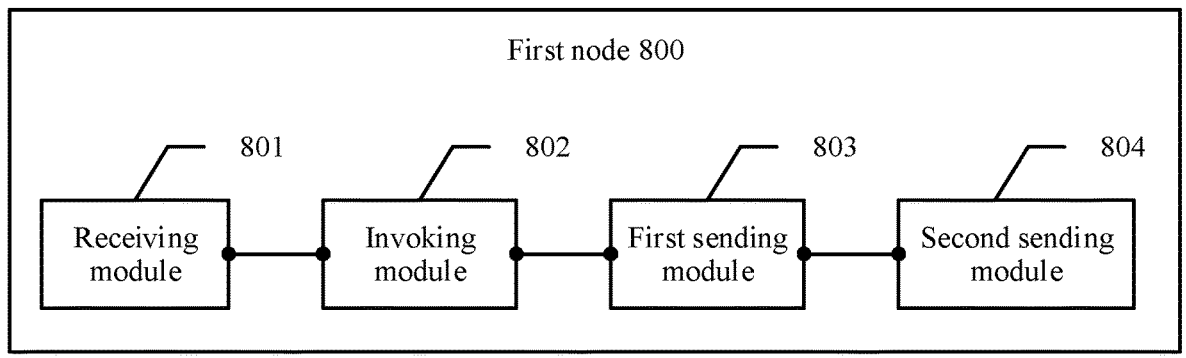
FIG. 8 is a schematic diagram of a structure of a first node according to an embodiment of this application.

Based on the embodiments corresponding to FIG. 3 and FIG. 4, to better implement the solutions in the embodiments of this application, the following further provides a node configured to implement the solutions. The node serves as a first node. For details, refer to FIG. 8. FIG. 8 is a schematic diagram of a structure of a first node 800 according to an embodiment of this application. The first node 800 may include a receiving module 801, configured to receive, by using a first process running on the first node 800, a first request sent by a first application corresponding to the first process, where the first request is used to indicate to write first data to a storage module; an invoking module 802, configured to invoke, based on the first request by using the first process, a first database engine on the first process to write the first data to a first storage module on the first node

800; a first sending module 803, configured to, when the operation of writing the first data to the first storage module is completed, send the first request to a second node by using the first process, so that the second node is enabled to write, based on the first request, the first data to a second storage module on the second node by invoking a second database engine on a second process, where the second process runs on the second node; and a second sending module 804, configured to, when a first response message sent by the second node by using the second process is received within preset duration by using the first process, send a second response message to the first application by using the first process, where the first response message is used to indicate that the operation of writing the first data to the second storage module is completed, and the second response message is used to indicate that both the operation of writing the first data to the first storage module and the operation of writing the first data to the second storage module are completed.

In a possible design, the first sending module 803 is further configured to, when the second node is faulty, cache second data, and send the second data to the second node by using the first process after the second node recovers to normal use, so that the second node is enabled to update the second data to the second storage module by invoking the second database engine, where the second data is data obtained after the first node 800 writes the first data to the first storage module by using the first process.

In a possible design, that the second node is faulty includes that a heartbeat sent by the second node to the first node 800 is abnormal, or the second node sends a fault notification message to the first node 800.

In a possible design, the first storage module includes a first in-memory database, and/or the second storage module includes a second in-memory database.

In a possible design, the invoking module 802 is further configured to record a first data version number by using the first process, where the first data version number is used to indicate an updated data version of data in the first storage module.

It should be noted that content such as information exchange and an execution procedure between the modules/units on the first node described in the embodiments corresponding to FIG. 8 is based on a same concept as the method embodiment corresponding to FIG. 3 and FIG. 4 in this application. For example content, refer to the descriptions in the method embodiment in this application. Details are not described herein again.

Figure 9:
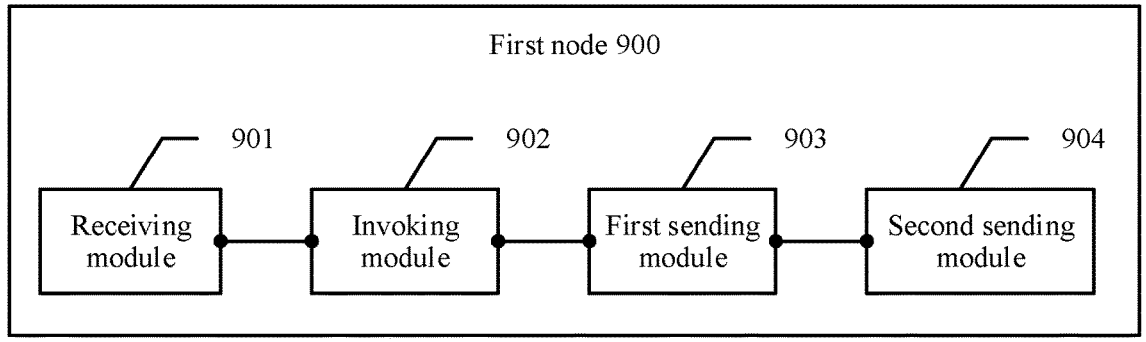
FIG. 9 is a schematic diagram of another structure of a first node according to an embodiment of this application.

Based on the embodiments corresponding to FIG. 5 and FIG. 6, to better implement the solutions in the embodiments of this application, the following further provides a node configured to implement the solutions. The node serves as a first node. For details, refer to FIG. 9. FIG. 9 is a schematic diagram of a structure of a first node 900 according to an embodiment of this application. The first node 900 may include a receiving module 901, configured to receive, by using a first process running on the first node 900, a second request forwarded by a second process running on a second node, where the second request is sent to the second node by a second application corresponding to the second process, and the second request is used to indicate to write third data to a storage module; an invoking module 902, configured to invoke, based on the second request by using the first process, a first database engine on the first process to write the third data to a first storage module on the first node 900; a first sending module 903, configured to, when the operation of writing the third data to the first storage module is completed, send a third response message to the second node by using the first process, where the third response message is used to indicate the second node to invoke, based on the second request by using the second process, a second database engine on the second process to write the third data to a second storage module on the second node; and a second sending module 904, configured to, when a fourth response message sent by the second node by using the second process is received within preset duration by using the first process, send a fifth response message to the second node by using the first process, so that the second node is enabled to forward the fifth response message to the second application by using the second process, where the fourth response message is used to indicate that the operation of writing the third data to the second storage module is completed, and the fifth response message is used to indicate that both the operation of writing the third data to the first storage module and the operation of writing the third data to the second storage module are completed.

In a possible design, the first sending module 903 is further configured to, when the second node is faulty, cache fourth data, and send the fourth data to the second node by using the first process after the second node recovers to normal use, so that the second node is enabled to update the fourth data to the second storage module by invoking the second database engine, where the fourth data is data obtained after the first node 900 writes the third data to the first storage module by using the first process.

In a possible design, that the second node is faulty includes that a heartbeat sent by the second node to the first node 900 is abnormal, or the second node sends a fault notification message to the first node 900.

In a possible design, the first storage module includes a first in-memory database, and/or the second storage module includes a second in-memory database.

In a possible design, the invoking module 902 is further configured to record a first data version number by using the first process, where the first data version number is used to indicate an updated data version of data in the first storage module.

It should be noted that content such as information exchange and an execution procedure between the modules/units on the first node described in the embodiments corresponding to FIG. 5 and FIG. 6 is based on a same concept as the method embodiment corresponding to FIG. 9 in this application. For example content, refer to the descriptions in the method embodiment in this application. Details are not described herein again.

Figure 10:
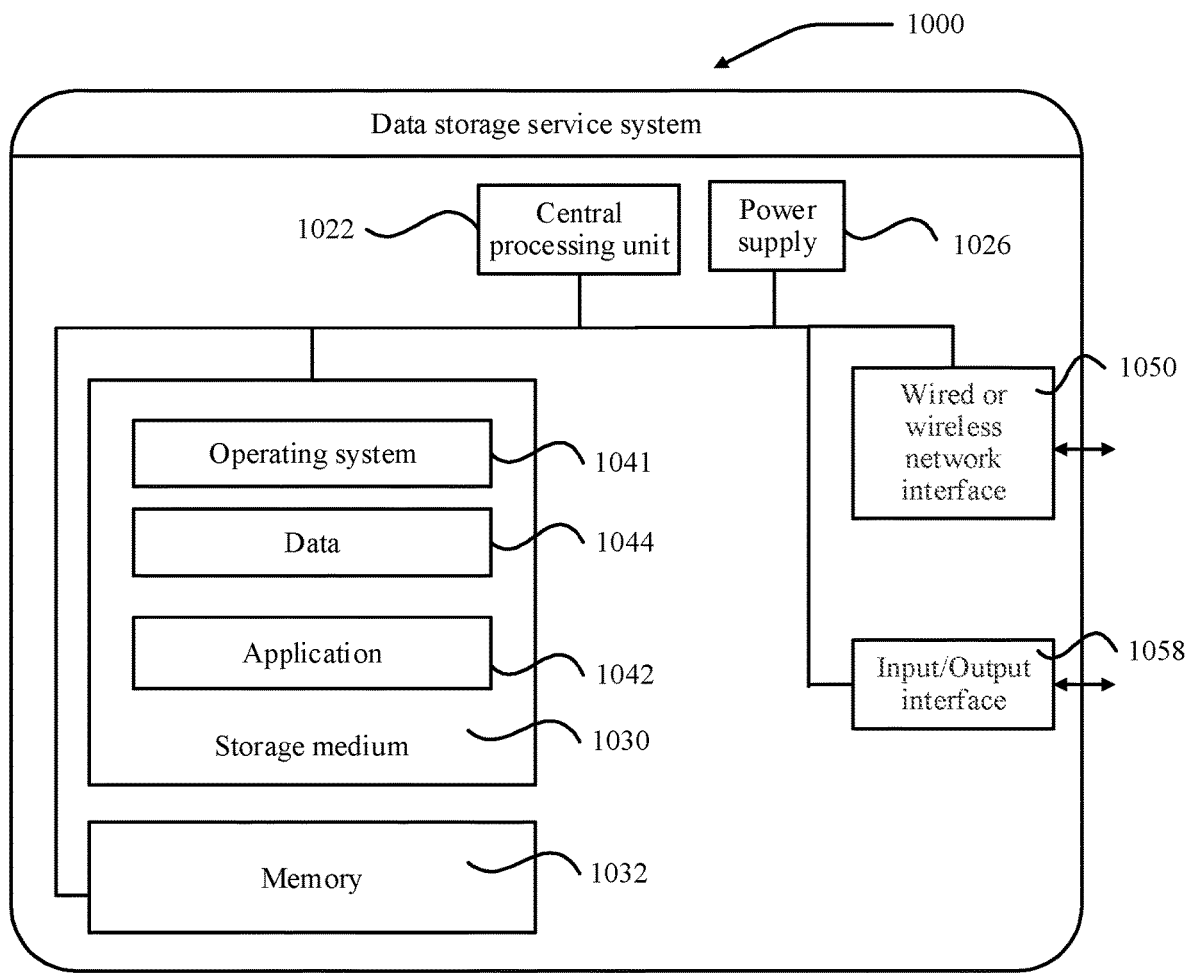
FIG. 10 is a schematic diagram of a structure of a data storage service system according to an embodiment of this application.

An embodiment of this application further provides a data storage service system. The data storage service system is deployed on a wheeled mobile device (for example, an autonomous vehicle). FIG. 10 is a schematic diagram of a structure of a data storage service system 1000 according to an embodiment of this application. For ease of description, only a part related to this embodiment of this application is shown. For technical details that are not disclosed, refer to the method parts in the embodiments of this application. Modules of the data storage service system described in the embodiment corresponding to FIG. 7 may be deployed on the data storage service system 1000, and are configured to implement functions of the embodiments corresponding to FIG. 3 to FIG. 6. In an example, the data storage service system 1000 is implemented by using one or more servers. The data storage service system 1000 may vary greatly due to different configurations or performance, and may include at least one central processing unit (central processing unit, CPU) 1022, a memory 1032, and at least one storage medium 1030 (for example, at least one mass storage device) storing an application 1042 or data 1044. The memory 1032 and the storage medium 1030 may be transitory or persistent storage. A program stored in the storage medium 1030 may include at least one module (not shown in the figure), and each module may include a series of instruction operations for a training device. Further, the central processing unit 1022 may be configured to communicate with the storage medium 1030, to perform, on the data storage service system 1000, the series of instruction operations in the storage medium 1030.

The data storage service system 1000 may further include at least one power supply 1026, at least one wired or wireless network interface 1050, at least one input/output interface 1058, and/or at least one operating system 1041 such as WINDOWS SERVER, MAC OS X, UNIX, LINUX, and FREEBSD.

In this embodiment of this application, steps performed by the first node and the second node in the embodiments corresponding to FIG. 3 to FIG. 6 may be implemented based on the structure shown in FIG. 10. Details are not described herein.

In addition, it should be noted that the described apparatus embodiments are merely examples. The units described as separate parts may or may not be physically separate, and parts displayed as units may or may not be physical units, that is, may be located in one place, or may be distributed on a plurality of network units. Some or all the modules may be selected according to an actual need to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables.

Based on the descriptions of the foregoing implementations, a person skilled in the art may clearly understand that this application may be implemented by using software in combination with necessary universal hardware, or certainly, may be implemented by using dedicated hardware, including a dedicated integrated circuit, a dedicated central processing unit (CPU), a dedicated memory, a dedicated component, or the like. Generally, any function that can be completed by using a computer program can be very easily implemented by using corresponding hardware. Moreover, example hardware structure used to implement a same function may be in various forms, for example, in a form of an analog circuit, a digital circuit, or a dedicated circuit. However, for this application, software program implementation is a better implementation in most cases. Based on such an understanding, the technical solutions of this application essentially or the part contributing to the conventional technology may be implemented in a form of a software product. The software product is stored in a readable storage medium, for example, a floppy disk, a Universal Serial Bus (USB) flash drive, a removable hard disk, a read-only memory (ROM), a random-access memory (RAM), a magnetic disk, or an optical disc of a computer, and includes several instructions for instructing a computer device (which may be a personal computer, a training device, a network device, or the like) to perform the methods described in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

What is claimed is:

1. A data storage method implemented by a first node device, wherein the data storage method comprises:
   receiving, from a first application, a first request using a first process running on the first node device;
   writing, in response to the first request and based on a first database engine on the first process, first data to a first storage on the first node device using the first process;
   sending, after the first data has been written to the first storage, the first request to a second node device using the first process to instruct the second node device to respond to the first request and to write, based on a second database engine on a second process of the second node device, the first data to a second storage on the second node device using the second process;
   receiving, from the second node device within a preset duration, a first response message using the first process, wherein the first response message indicates that the first data has been written to the second storage; and
   sending, to the first application after receiving the first response message, a second response message using the first process,
   wherein the second response message indicates that both the first data has been written to the first storage and that the first data has been written to the second storage.

2. The data storage method of claim 1, further comprising instructing the second node device to replace the first node device with the second node device to provide a service when the first node device is faulty.

3. The data storage method of claim 2, wherein replacing the first node device to provide the service comprises:
   temporarily replacing the first node device to provide the service until the first node device recovers to normal use; or
   permanently replacing the first node device to provide the service.

4. The data storage method of claim 2, further comprising:
   sending an abnormal heartbeat to the second node device when the first node device is faulty; or
   sending a fault notification message to the second node device when the first node device is faulty.

5. The data storage method of claim 1, wherein before sending the second response message to the first application, the data storage method further comprises:
obtaining second data after the first data has been written by the first node device to the first storage using the first process;
caching the second data when the second node device is faulty; and
sending the second data to the second node device using the first process after the second node device has recovered to normal use to enable the second node device to update the second data to the second storage based on the second database engine.

6. The data storage method of claim 5, further comprising determining the second node device is faulty when:
receiving an abnormal heartbeat from the second node device; or
receiving a fault notification message from the second node device.

7. The data storage method of claim 1, wherein the first storage comprises a first in-memory database, the second storage comprises a second in-memory database, or the first storage comprises the first in-memory database and the second storage comprises the second in-memory database.

8. The data storage method of claim 1, wherein after writing the first data to the first storage on the first node device using the first process, the data storage method further comprises:
obtaining an updated first data version of data after writing the first data to the first storage on the first node device; and
recording a first data version number using the first process, wherein the first data version number indicates the updated first data version of data in the first storage.

9. The data storage method of claim 1, wherein sending the first request to the second node device using the first process instructs the second node device to:
respond to the first request and write, based on the second database engine on the second process, the first data to the second storage on the second node device using the second process;
obtain second data after the first data has been written by the first node device to the first storage using the first process; and
record a second data version number using the second process, wherein the second data version number indicates an updated second data version of data in the second storage.

10. A data storage service system deployed on a wheeled mobile device, wherein the data storage service system comprises:
a first node device configured to:
receive, from a first application, a first request using a first process running on the first node device;
write, in response to the first request and based on a first database engine on the first process, first data to a first storage on the first node device using the first process;
send, after the first data has been written to the first storage, the first request using the first process;
receive, within a preset duration using the first process, a first response message using the first process; and
send, to the first application after receiving the first response message, a second response message using the first process, wherein the second response message indicates that both the first data has been written to the first storage and the first data has been written to a second storage; and
a second node device configured to:
receive, from the first node device, the first request that instructs the second node device to respond to the first request and to write, based on a second database engine on a second process of the second node device, the first data to the second storage on the second node device using the second process;
respond to the first request by writing, based on the second database engine on the second process, the first data to the second storage on the second node device using the second process, wherein the first response message indicates that the first data has been written to the second storage;
send, to the first node device in response to writing the first data to the second storage within the preset duration, the first response message using the second process.

11. The data storage service system of claim 10, wherein the second node device is further configured to replace the first node device with the second node device to provide a service when the first node device is faulty.

12. The data storage service system of claim 11, wherein the second node device is further configured to:
temporarily replace the first node device with the second node device to provide the service until the first node device recovers to normal use; or
permanently replace the first node device with the second node device to provide the service.

13. The data storage service system of claim 11, wherein the first node device is faulty when:
a heartbeat from the first node device to the second node device is abnormal; or
the first node device sends a fault notification message to the second node device.

14. The data storage service system of claim 10, wherein the first node device is further configured to:
obtain second data after the first data has been written by the first node device to the first storage using the first process;
cache the second data when the second node device is faulty; and
send the second data to the second node device using the first process after the second node device recovers to normal use, and wherein the second node device is further configured to update the second data to the second storage based on the second database engine.

15. The data storage service system of claim 14, wherein the second node device is faulty when:
a heartbeat from the second node device to the first node device is abnormal; or
the second node device sends a fault notification message to the first node device.

16. The data storage service system of claim 10, wherein the first storage comprises a first in-memory database, the second storage comprises a second in-memory database, or the first storage comprises the first in-memory database and the second storage comprises the second in-memory database.

17. The data storage service system of claim 10, wherein the first node device is further configured to:
obtain an updated first data version of data after the first data has been written to the first storage on the first node device; and record a first data version number using the first process, wherein the first data version number indicates the updated first data version of data in the first storage.

18. The data storage service system of claim 10, wherein the second node device is further configured to:
   obtain an updated second data version of data after the first data has been written by the first storage to the second storage on the first node device; and
   record a second data version number using the second process, wherein the second data version number indicates the updated second data version of data in the second storage.

19. A computer program product comprising a non-transitory computer readable storage medium having stored instructions and that, when executed by one or more processors, cause a first node device to:
   receive, from a first application, a first request using a first process running on the first node device;
   write, in response to the first request and based on a first database engine on the first process, first data to a first storage on the first node device using the first process;
   send the first request to a second node device using the first process after the first data has been written to the first storage to instruct the second node device to respond to the first request and to write, based on a second database engine on a second process of the second node device, the first data to a second storage on the second node device using the second process;
   receive, from the second node device within a preset duration, a first response message using the first process, wherein the first response message indicates that the first data has been written to the second storage; and
   send, to the first application after receiving the first response message, a second response message using the first process, wherein the second response message indicates that both the first data has been written to the first storage and that the first data has been written to the second storage.

20. The computer program product of claim 19, wherein the instructions that when executed by the one or more processors further cause the first node device to instruct the second node device to replace the first node device with the second node device to provide a service when the first node device is faulty.

* * * * *